(12) United States Patent
Li et al.

(10) Patent No.: US 10,890,345 B2
(45) Date of Patent: Jan. 12, 2021

(54) SYSTEM AND METHODS FOR A COMMISSIONING A SENSOR SYSTEM

(71) Applicant: Verdigris Technologies, Inc., Mountain View, CA (US)

(72) Inventors: Daniela Li, Mountain View, CA (US); Michael Roberts, Mountain View, CA (US); Joe Phaneuf, Mountain View, CA (US); William Chan, Mountain View, CA (US)

(73) Assignee: Verdigris Technologies, Inc., Mountain View, CA (US)

( * ) Notice: Subject to any disclaimer, the term of this patent is extended or adjusted under 35 U.S.C. 154(b) by 172 days.

(21) Appl. No.: 16/100,098

(22) Filed: Aug. 9, 2018

(65) Prior Publication Data
US 2020/0348036 A1 Nov. 5, 2020

Related U.S. Application Data

(60) Provisional application No. 62/543,234, filed on Aug. 9, 2017.

(51) Int. Cl.
| | |
|---|---|
| *F24F 11/30* | (2018.01) |
| *G05B 19/042* | (2006.01) |
| *F24F 11/52* | (2018.01) |
| *F24F 11/58* | (2018.01) |
| *F24F 11/63* | (2018.01) |
| *G06K 9/00* | (2006.01) |
| *F24F 11/88* | (2018.01) |
| *G06T 7/90* | (2017.01) |
| *H04N 5/232* | (2006.01) |

(52) U.S. Cl.
CPC .............. *F24F 11/30* (2018.01); *F24F 11/52* (2018.01); *F24F 11/58* (2018.01); *F24F 11/63* (2018.01); *F24F 11/88* (2018.01); *G05B 19/042* (2013.01); *G06K 9/00671* (2013.01); *G05B 2219/25011* (2013.01); *G05B 2219/2639* (2013.01); *G06T 7/90* (2017.01); *H04N 5/232* (2013.01)

(58) Field of Classification Search
None
See application file for complete search history.

(56) References Cited

U.S. PATENT DOCUMENTS

| | | | | |
|---|---|---|---|---|
| 5,859,596 | A * | 1/1999 | McRae | H02J 13/0086 324/424 |
| 9,397,484 | B2 * | 7/2016 | Woodbury | G01R 15/18 |
| 9,852,388 | B1 * | 12/2017 | Swieter | G06Q 10/06313 |
| 10,239,612 | B1 * | 3/2019 | Whitten | G06Q 10/10 |

(Continued)

*Primary Examiner* — Jason Lin
(74) *Attorney, Agent, or Firm* — Procopio, Cory, Hargreaves & Savitch LLP

(57) ABSTRACT

A method of facilitating configuration of at least one sensor with a data transmitter communicatively coupled to an analysis engine for a building management system, wherein the application is configured to be run on a mobile device and interact with the at least one sensor during the installation. The method includes communicating, by the application, with the at least one sensor to display a visual indicator, capturing, by a camera of the mobile device, visual data representative of the visual indicator, and associating the at least one sensor with a circuit of a building power system based on the captured visual data.

18 Claims, 22 Drawing Sheets
(18 of 22 Drawing Sheet(s) Filed in Color)

(56) References Cited

U.S. PATENT DOCUMENTS

| | | | | |
|---|---|---|---|---|
| 2012/0001617 | A1* | 1/2012 | Reynolds | G01R 15/18 |
| | | | | 324/74 |
| 2013/0030589 | A1* | 1/2013 | Pessina | H05B 47/19 |
| | | | | 700/295 |
| 2013/0076491 | A1* | 3/2013 | Brandsma | H04B 5/0062 |
| | | | | 340/10.3 |
| 2013/0221203 | A1* | 8/2013 | Barrilleaux | G01J 1/0266 |
| | | | | 250/208.2 |
| 2016/0092198 | A1* | 3/2016 | Vangeel | F24F 11/30 |
| | | | | 717/173 |
| 2017/0290132 | A1* | 10/2017 | Amrine | H05B 45/10 |
| 2018/0212793 | A1* | 7/2018 | Burger | H04L 12/2809 |

\* cited by examiner

| Service Panel Operation Mode | Data Transmitter LED Indicator | Interpretation | CT or GIM Indicator | Troubleshoot |
|---|---|---|---|---|
| Voltage | Solid Green | Three-Phase WYE | | System is connected to the panel configuration listed in the 'Interpretation' column. |
| | Blinking Green | Three-Phase Delta 240V | | |
| | Blinking Green | Three-Phase Delta VMM | | |
| | Blinking Green | Two-Phase 120V | | |
| | Blinking White | Split-Phase | | |
| | Solid White | Single Phase | | |
| | Blinking Red | Other panel configuration | | Voltage configuration not recognized. Check the voltage taps are connected correctly. |
| | Blinking Blue | Busy system | | System is processing. Wait for LED indicator to change. |
| | Solid Yellow | CT chain error | Some CT/GIM LED indicators may be off | Debug CT chain, see 'CT Chain' row in table. |
| Wireless (LTE and/or Wi-Fi) | Blinking Red | Module broken (LTE and/or WiFi) | | LTE and/or WiFi module needs to be replaced. |
| | Solid Red | No signal (LTE and/or WiFi) | | LTE and/or WiFi module may not be connected properly to Data Transmitted. |
| | Blinking Yellow | Internet, no Verdigris (LTE and/or WiFi) | | Cannot connect to the Verdigris servers. |
| | Solid Yellow | LAN; no internet (WiFi) | | Cannot reach any external networks. |
| | Blinking Blue | Busy system | | System is processing. Wait for LED indicator to change. |
| | Solid Green | System is connected to LTE and/or WiFi | | |
| CT Chain | Blinking Red | Break in CT chain | Properly connected CT LEDs will be blinking white; excess CT LEDs will be off | CT chain is not completely connected. Check for a break in the CT chain. Press power button to reset CT chain connectivity. |
| | Solid Red | Too many CTs on CT chain | Properly connected CT LEDs will be blinking white; excess CT LEDs will be off | Chains can have 21 CTs total, if and only if CTs are the only thing plugged into a chain. When you add GIMs this number changes (i.e. 18 CTs + 1 GIM, 15 CTs + 2 GIMs, etc). |
| | Blinking Blue | CT connectivity in progress | | System is processing. Wait for LED indicator to change. |
| | Solid Green | CT chain is connected properly | | |

FIG. 20

SYSTEM AND METHODS FOR A COMMISSIONING A SENSOR SYSTEM

CROSS-REFERENCE TO RELATED APPLICATIONS

This application claims the benefit of priority from Provisional U.S. Patent application Ser. No. 62/543,234, filed Aug. 9, 2018, the contents of which are incorporated by reference.

BACKGROUND

Field

The present disclosure relates to power sensors, and more specifically, to systems and methods for commissioning power sensors.

Related Art

In related art implementations, building management systems are typically custom designed proprietary monitoring systems for commercial buildings that set off alarms when there is a malfunction of a critical device. These related art building management systems rely on facilities managers and engineers to configure systems and study power performance metrics to calibrate power usage that keeps buildings running 24 hours a day. Some building management systems allow facilities managers and engineers to remotely manage specific settings of critical devices.

In related art systems, electric metering may be used to determine how much electricity a consumer is using. In related art systems, metering was typically accomplished through the use of an electricity meter attached to a power line between a building (home, business, or otherwise) and the electric company. However, such systems often could only provide information about total energy usage for the entire building and could not provide information about energy consumption associated with specific circuits within the building.

Related art smart metering systems were developed to analyze individual circuits within a building by connecting a sensor to each circuit, often at the circuit breaker box. However, these related art systems may involve either disconnecting power to the entire box, resulting in lost work time, or connecting a sensor to the energized power lines, which can be dangerous.

Further, installation and configuration of these related art sensor networks typically require extensive training, professional expertise, and time. In the related art, power tracking involves installing multiple sensors in each room of a building that can involve replacing appliances and opening walls, and can suffer from connectivity issues to deliver collected data.

SUMMARY

In example implementations, a building's power performance is monitored in real-time using sensors located at a central distribution point of the building.

Systems and methods described herein include a method of facilitating configuration of at least one sensor with a data transmitter communicatively coupled to an analysis engine for a building management system, wherein the application is configured to be run on a mobile device and interact with the at least one sensor during the installation. The method includes communicating, by the application, with the at least one sensor to display a visual indicator, capturing, by a camera of the mobile device, visual data representative of the visual indicator, and associating the at least one sensor with a circuit of a building power system based on the captured visual data.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 20 illustrates example troubleshooting messages communicated via indicators on the sensor or data, or communicated via the handheld device.

DETAILED DESCRIPTION

Figure 1:
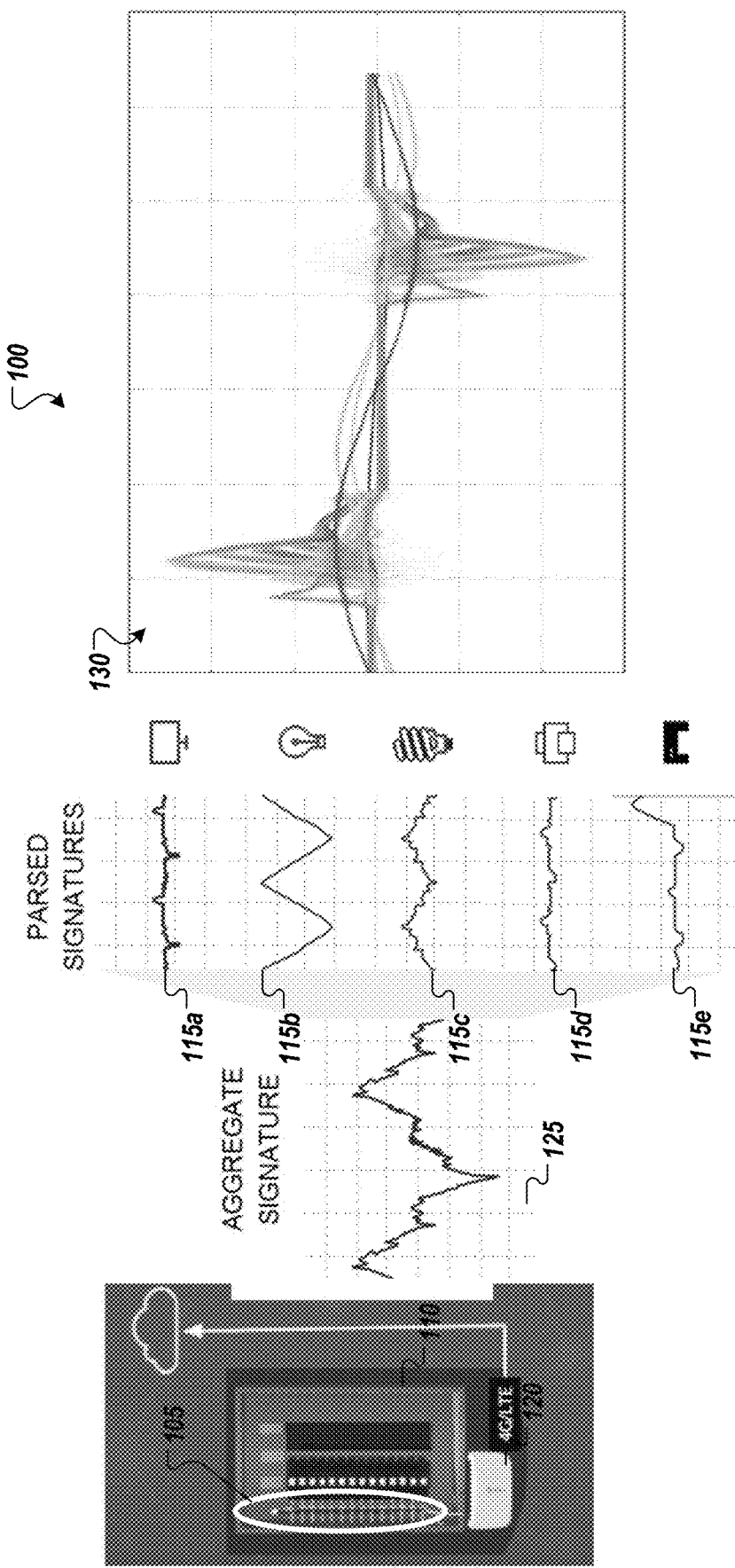
FIG. 1 illustrates a schematic representation of parsed signature analysis in accordance with example implementations.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates a user interface 100 illustrating parsed signature analysis in accordance with an example implementation. Sensors 105 (e.g., current transformers) can be coupled to a local power system 110 to monitor aggregate power used at a location (e.g., commercial, industrial, or residential building). In an example implementation, circuit based sensors 105 can collect power usage data at a central power distribution point of the location, for example, a distribution board 110 (e.g., panelboard, breaker panel, electric panel, etc.). According to an example system, circuit based sensors 105 can be used at an electric panel 110, where a single sensor is attached onto each circuit, and the sensors can be interconnected with a data transmitter to connect to a cloud analyzer system 120. For example, circuit based sensors can be used for super-high-frequency disaggregation (e.g., 8 kilohertz).

Each circuit based sensor 105 may capture a power draw signal (represented by power signatures 115a-115e) associated with individual circuits of the local power system 110 connected to an individual device. The individual power draw signatures 5a-115e may be isolated from the aggregate signature 125 (e.g., the total power draw of the local power system 110). A User interface 130 may be provided to show the aggregate signature 125 overlaid with the individual signatures 115a-115e.

According to example implementations, one or more of the sensors 105 may be a current transformer 205 as discussed below. Each current transformer 205 may be attached to each circuit of the local power system and gather power draw information that is analyzed to determine power performance for each device attached to the local power system.

Figure 2A:
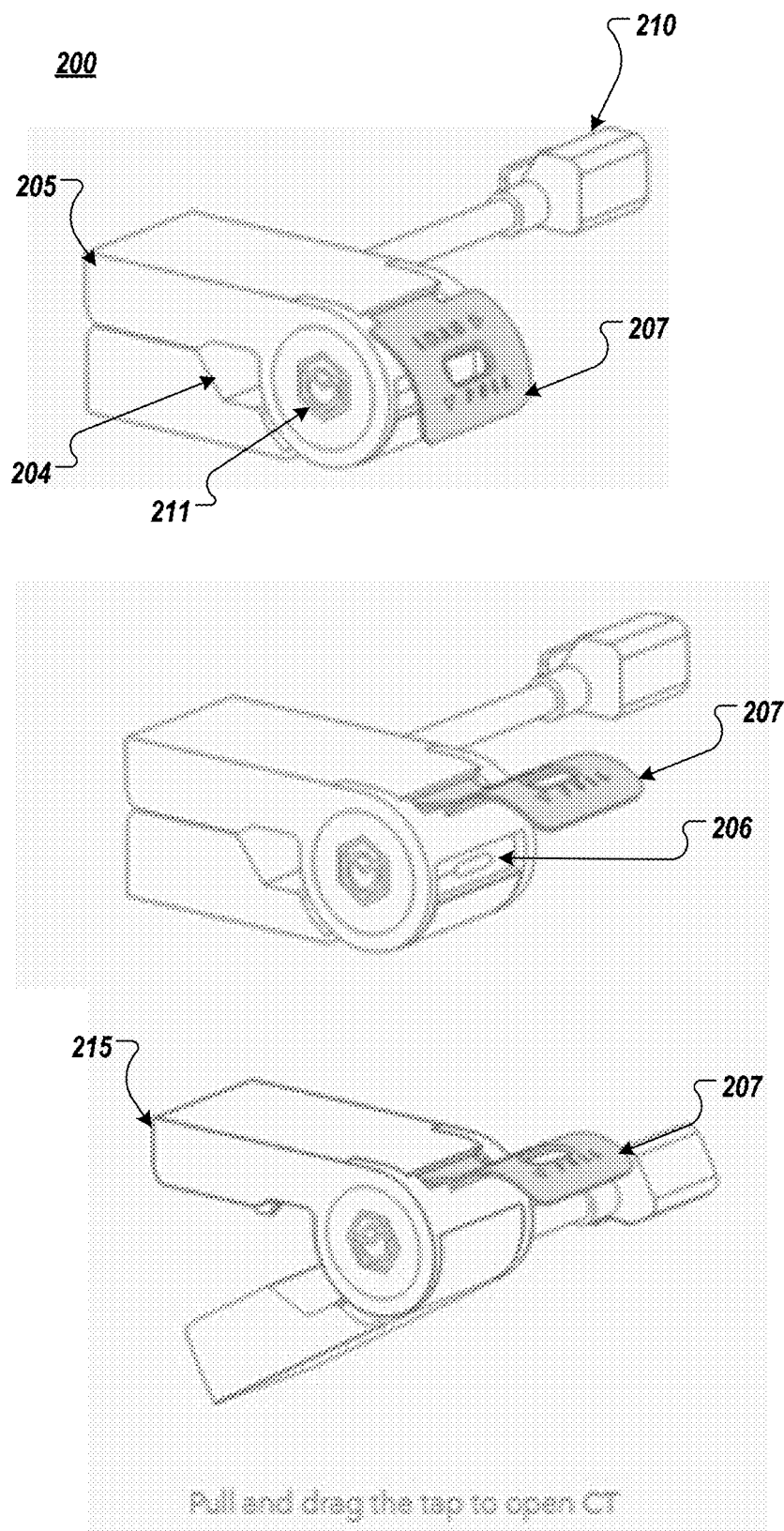
FIGS. 2A-C depict examples of components for a current transformer sensor system in accordance with example implementations.
Figure 2B:
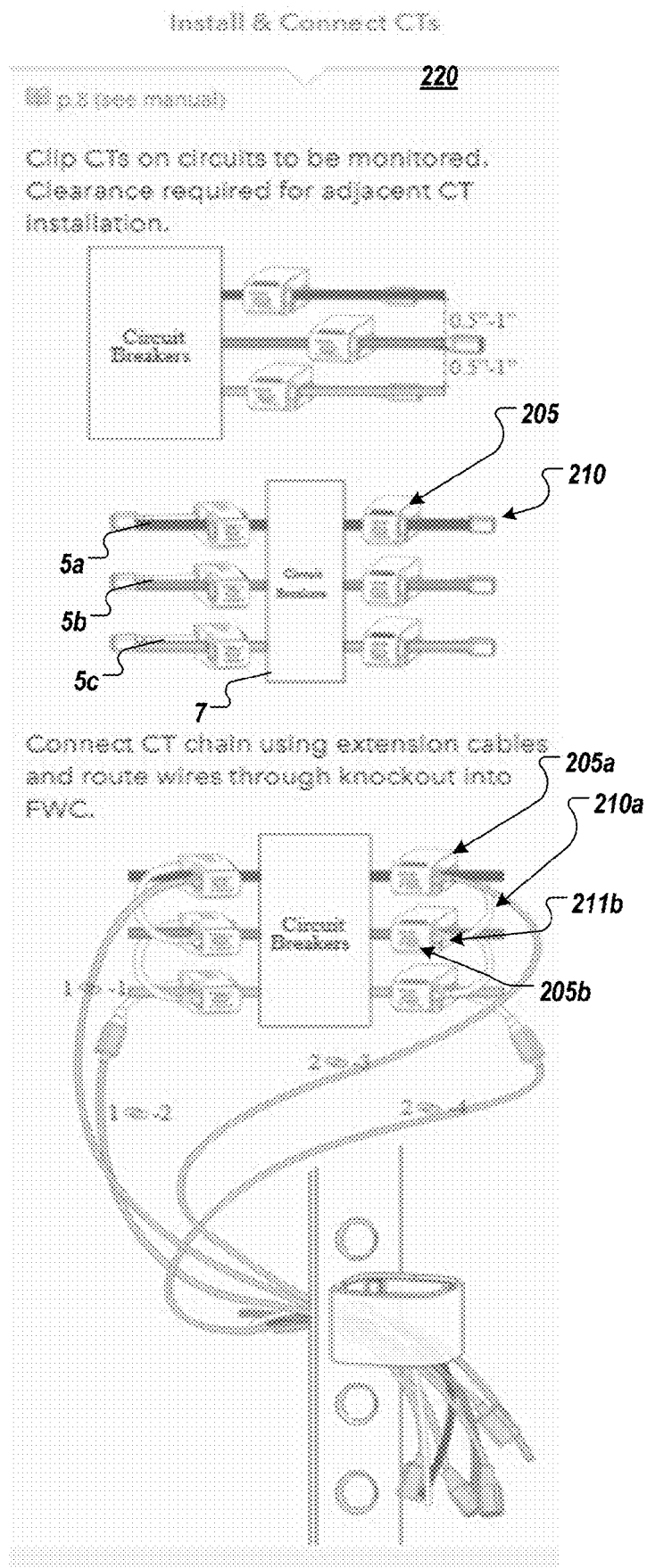
Figure 2C:
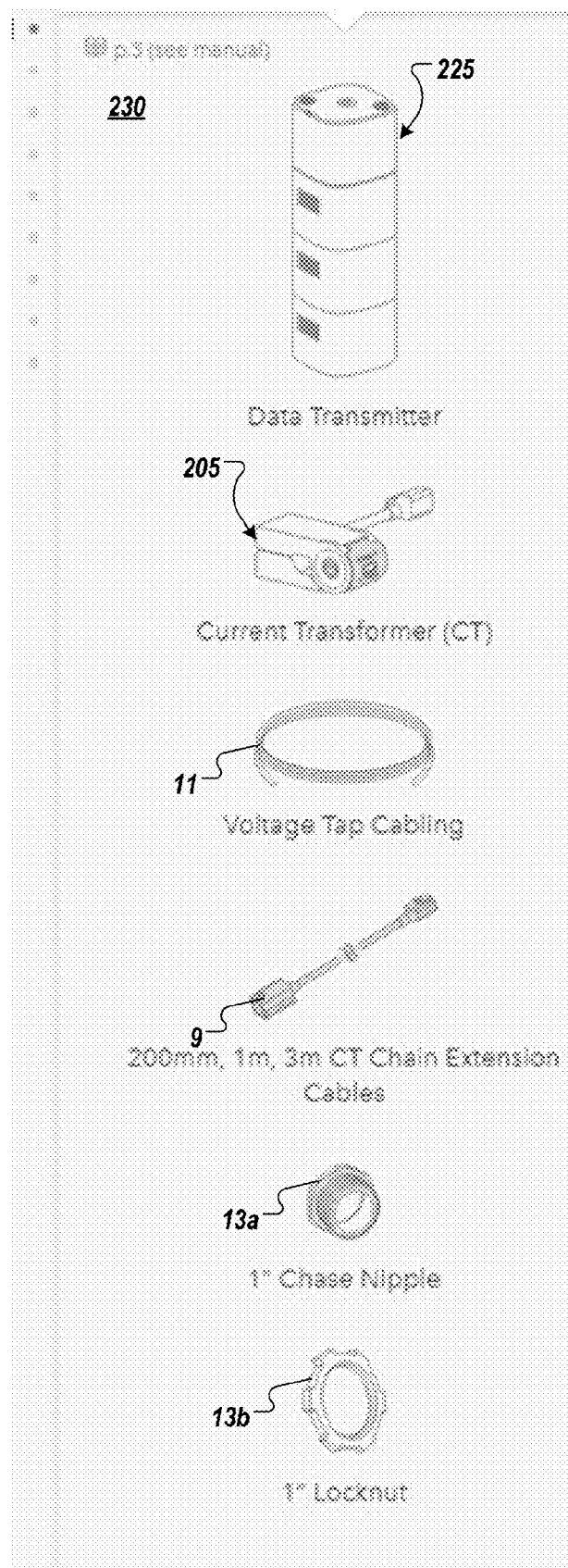

FIGS. 2A-C depict examples of components for a current transformer sensor system in accordance with an example implementation. As illustrated, the sensors (e.g., a current transformer 205 sensor) are attached to circuit wires in a distribution box and connect to a data transmitter 225 device with connectivity to an analysis engine (e.g., analysis processors or software running on a computing device, such as computing device 1905 illustrated in FIG. 19 discussed below). Various configurations can be used for sensors and data transmission as may be apparent to a person of ordinary skill in the art. For example, each sensor can include a near-field communication means to deliver collected data to the analysis engine via the data transmitter 225. In some example implementations, the current transformer sensors 205 may be interconnected and connected to a hub with the data transmitter 225 device in order to provide reliable communication and reduce signal interference at the distribution box of the local power system.

In an example implementation, the current transformer 205 may include a body including an upper half and a lower half hingedly connected to the upper half, and a latch mechanism 207 with a slider mechanism that can open 215 into an upper half and a lower half to wrap around wires for power circuits of a building. The current transformer 205 can also include an indicator element 206, such as an LED or other visual indicator to provide status and/or indicator information such as connection status, signal status or any other information to a mobile application. By opening in this configuration, an electrified cable of the circuit can be inserted into the sensing gap 204. The current transformer 205 extracts current from the electrified cable passing through the sensing gap 204. The upper and lower halves may be separated by pulling the grip tab 207 in the direction away from the sensing gap 204. The example structure of the current transformer 205 may allow for safe, one handed opening of the upper and lower halves of the body even if gloves are being worn.

In the example implementation, the current transformer 205 may include an encased upper and lower ferrite core and circuit board in combination with a Hall-effect sensor to extract current passing through the electrified cable passing through the sensing gap 204. In some example implementations, though the Hall-effect sensor is between the lower ferrite core pieces, other types of sensors may be incorporated into the region surrounding the sensing gap 204 to monitor and detect electrical flow through the sensing gap 204 in a non-contacting manner. For example, temperature sensors, flow sensors, or any other type of sensor may be apparent to a person of ordinary skill in the art.

Additionally, in some example implementations, the current transformer 205 may extract current from the electrified cable passing through the sensing gap 204. Further, in some example implementations, bladed protrusions may be incorporated into the sensing gap 204 to allow energized cables passing through the sensing gap 204 to be penetrated and directly tapped (e.g., monitored directly or in a contacting manner).

As illustrated in FIG. 2B, a current transformer 205 can be attached to each circuit of the local power system. In some example implementations, multiple current transformers 205a, 205b may be interconnected using connectors 210. For example, current transformer 205a may include a connector 210a that can attach to a receptor 211b of another current transformer 205b, for example, in a daisy-chain configuration. This daisy-chain configuration may minimize the space and wiring in the distribution box. Other example implementations can include a bus or switching topology for connecting the sensors (e.g., current transformers 205) to the data transmitter 225.

As illustrated, the current transformer 205 includes a body having a female connector 210 and a male connector 211. For example, the female connector 210 may include female mini-High Definition Media Interface (mini-HDMI) port and the male connector 211 may include male mini-HDMI plug. However, other types of ports and plugs may be apparent to a person of ordinary skill in the art. In some example implementations, one or both of the female connector 210 and the male connector 211 may be connected to the sensor body by a cable. The female and male connectors 210, 211 may be configured to allow connection between multiple current transformers 205a, 205b. For example, a female connector 210a of one current transformer 205a may connect to a male connector 211b of another current transformer 205b as illustrated in FIG. 2B.

Installation of the sensor system can include the current transformer 205a, 205b sensors attached to circuit wires 5a-5c in a distribution box 7, interconnected with the connectors 210 and connect to the data transmitter 225 device with connectivity to an analysis engine (e.g., analysis processors or software running on a computing device, such as computing device 1905 illustrated in FIG. 19 discussed below), as described in greater detail below. For example, the first and last sensor in the daisy-chain configuration can connect to the data transmitter 225 via extension cables. To accommodate different layouts or types of the distribution boxes, the data transmitter 225 may connect to more than one daisy-chain of sensors. Various additional components can be included to accommodate configurations and physical assembly, for example, extension cables 9, voltage tap cabling 11, and other mounting components 13a/13b.

Figure 3:
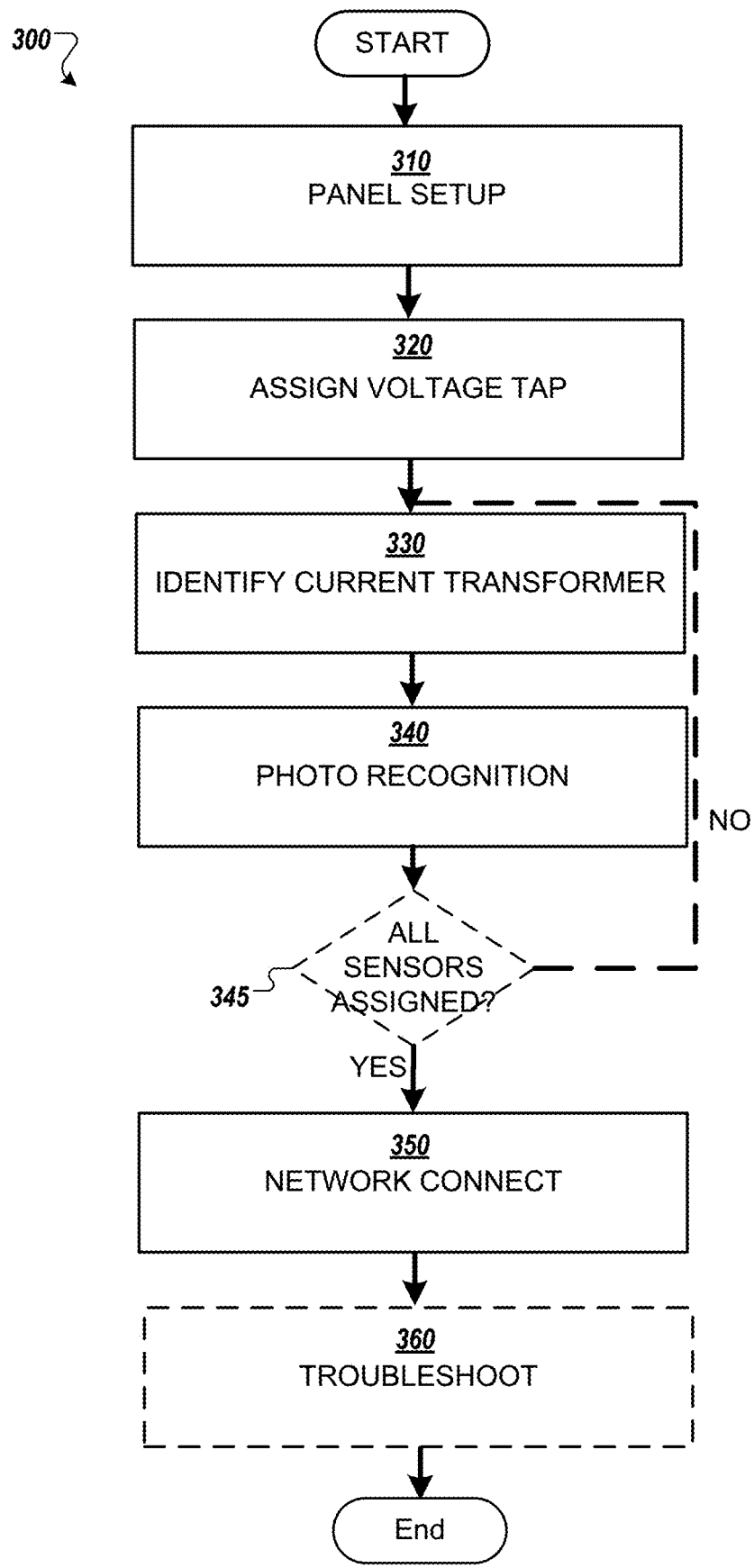
FIG. 3 illustrates a flow diagram of a commissioning process in accordance with example implementations of the present application.

FIG. 3 illustrates a flow diagram of a commissioning process 300 in accordance with example implementations of the present application. The process may be used to register or set-up a sensor (e.g., a Current transformer 205) as part of a power management or monitoring system connected to a power distribution system, such as a power distribution system of a building. In some example implementations, an application (e.g., a mobile app running on a computing device, such as computing device 1905 illustrated in FIG. 19 discussed below) may facilitate installation and configuration of sensors with an analysis engine for the power management/monitoring system. This application may be run on a handheld device (e.g., a smart-phone) and interact with sensors during the install. The sensors can include an indicator element, such as the LED 206 or other visual indicator, to provide status and/or indicator information such as connection status, signal status or any other information to the mobile application.

At block 310, the application launches a panel set up interface to guide the user on locating components to connect. The application may allow the user to identify or specify each circuit in a circuit panel and any devices associated with each circuit in the panel (e.g., heating, ventilation and air conditioning (HVAC) system circuit, lighting circuit, server room circuit, etc.) For example, a generic diagram of a circuit panel may be provided to allow a user to specify which circuit of the panel is being set up. In other example implementations, a specific circuit panel configuration may be retrieved from a library based on a model number or other unique identifier.

At block 320, the application may guide the user to set up a voltage tap on a breaker to power the sensors and data transmission. The voltage tap can be performed without shutting off any breakers if there is at least 1 spare breaker per phase. For example, the user may open the panel and locate a spare breaker on each phase. If no spare breakers are present, but there are empty slots in the panel, spare breakers can be inserted and used for the voltage tap as well. Otherwise, the power supply can be briefly shut down by the voltage tap breakers.

Voltage tap cables may be connected to the data transmitter terminal blocks and the voltage tap breaker can be turned on. The data transmitter voltage taps may have a built-in in-line fuse and may not require additional fuse protection. In some example implementations, a light ring on the data transmitter 225 may be used to indicate the voltage tap was successful. For example, a pulsing white light may indicate that the system is working correctly and a blinking red can indicate to proceed to troubleshooting.

At block 330, the application prompts user to assign a sensor (e.g., current transformer 205) for each circuit of the local power system. Using the indicators (e.g., LED 206 or other visual indicator) on the sensors, the application may receive communication from within the sensors to assign a label for each circuit. In some example implementations, each selected breaker may be labeled ("Switch for VS sub-metering") using the application.

At block 340, a photo recognition sequence can use a camera of the handheld device to capture information communicated by the indicator. For example, the LED 206 on the sensor may flash at a specific frequency or color that is captured by the camera of the handheld device and the application can associate the sensor with the assigned circuit.

In some example implementations, a determination may be made at 345 whether all sensors that need to be assigned have been assigned. For example, an option may be provided to a user to assign more sensors. If not all sensors have been assigned (e.g., NO at 345), the process 300 may return to 330 and blocks 330 and 340 may be repeated. Conversely, if all sensors have been assigned (e.g., YES at 345), the process 300 may proceed to block 350.

At block 350, the application may establish a network connection via the data transmitter for delivering the collected data to a computing device (e.g., computing device 1905 of FIG. 19 discussed below). The network connection may be a wireless network connection, a BLUETOOTH network connection, a cellular communication network connection, or any other type of network connection that might be apparent to a person of ordinary skill in the art.

At block 360, the application can optionally provide the user with various troubleshooting options using the indicators (e.g., LED 206 or other visual indicator) associated with each sensor and/or the LED ring of the data transmitter. FIG. 20 depicts example troubleshooting messages communicated via indicators on the sensor or data, or communicated via the handheld device.

Figure 4:
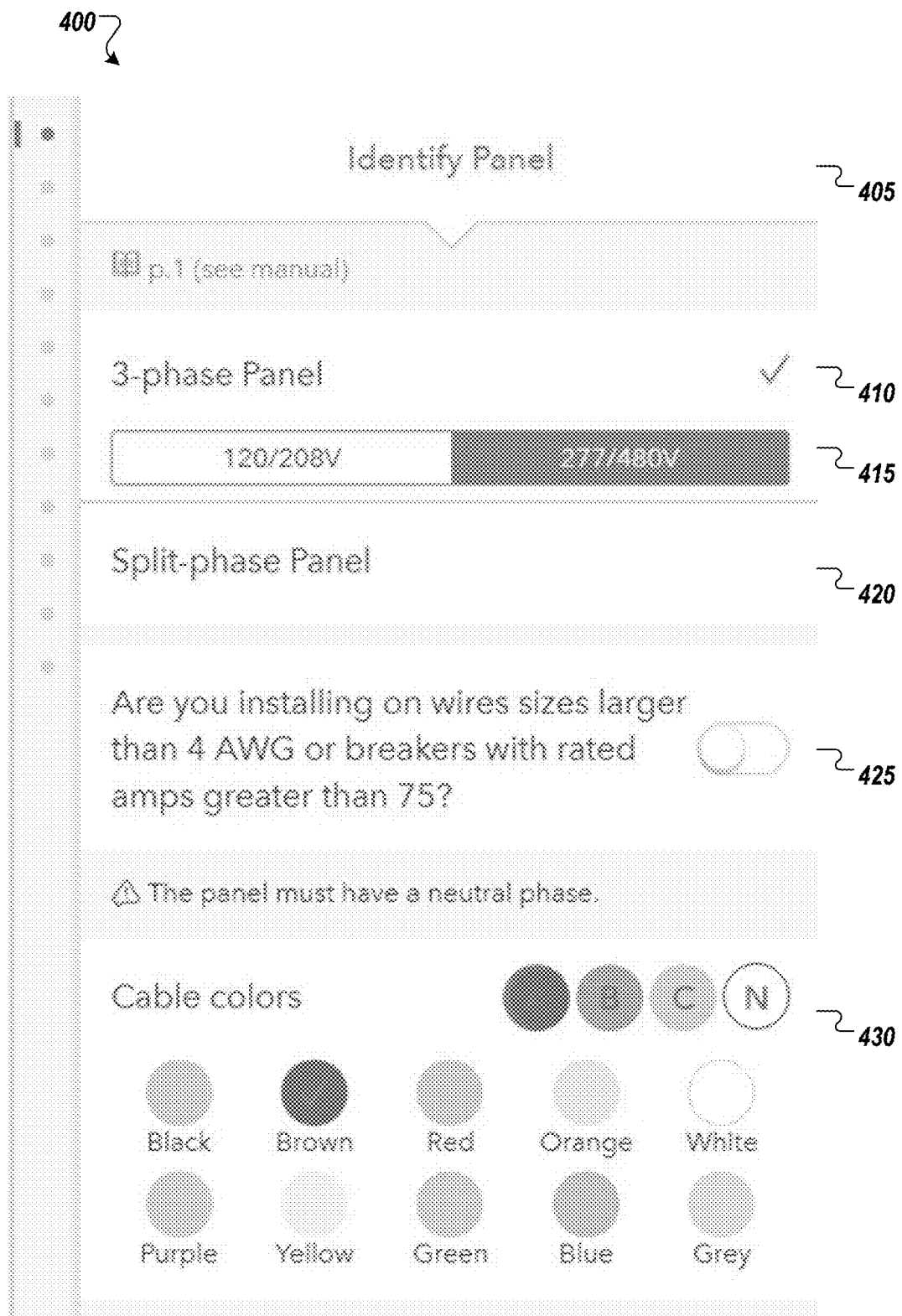
FIG. 4 illustrates an example panel setup interface (UI) in accordance with example implementations of the present application.

FIG. 4 illustrates an example panel setup interface (UI) 400 in accordance with example implementations of the present application. The UI 400 may be displayed on display screen of a computing device, such as computing device 1905 of FIG. 19. As illustrated, the UI 400 may provide multiple fields or control options 405-430 to be used to set up the panel. Field 405 may be used to identify or provide a name for the panel. Check box 410 may be used to identify the panel as a three-phase panel. Control 415 may be used to identify the voltage of the panel. Control 420 may be used to identify the panel as a split-phase panel. Control field 425 may be used to identify wire sizes or breakers exceeding certain thresholds (e.g., wire sizes larger than four AWG, or breakers greater than 75 A, for example). Further, control area 430 may be used to specify the cable or wire colors associated with the panel.

Figure 5:
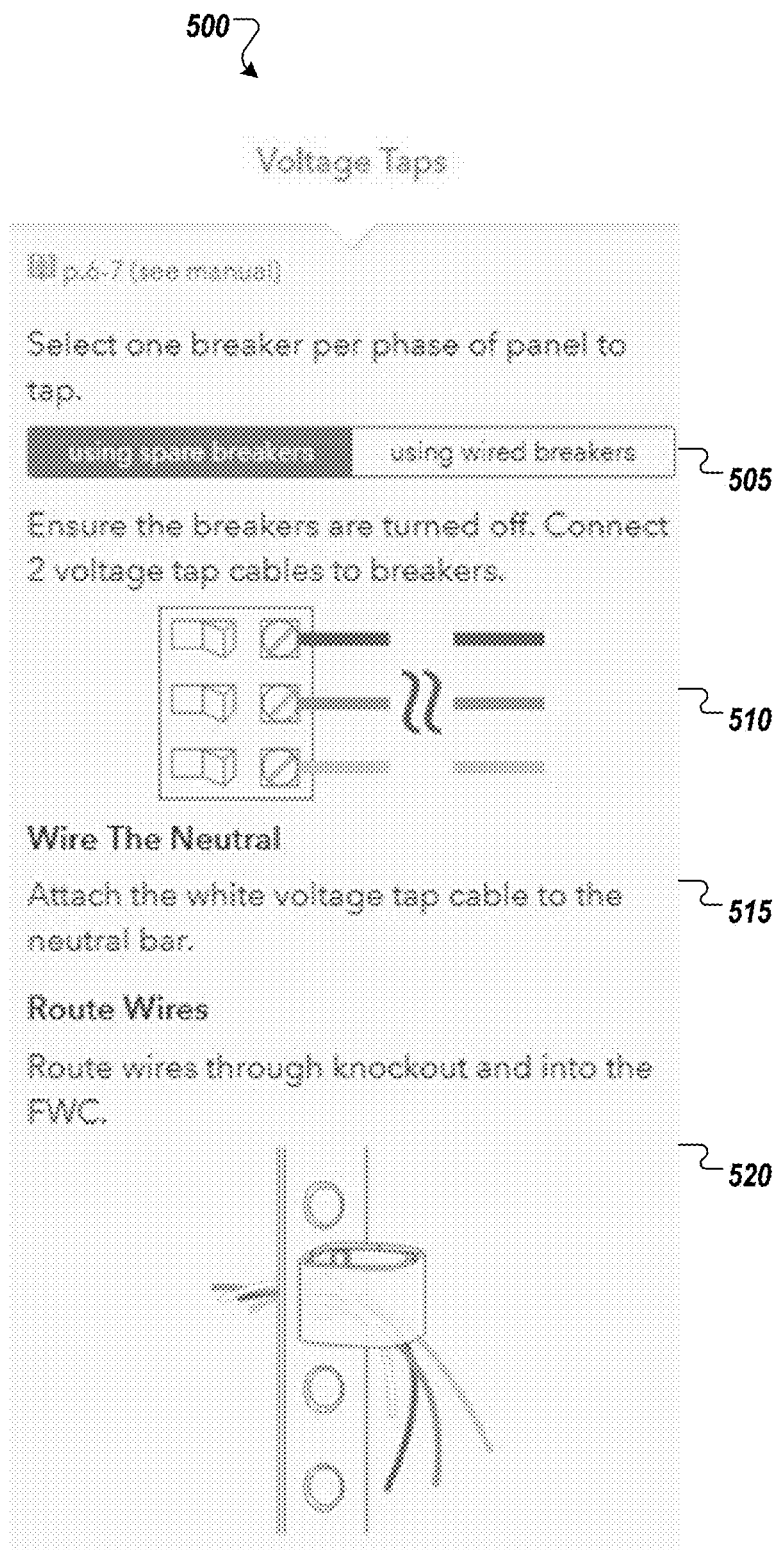
FIG. 5 illustrates an example interface (UI) for voltage tap configuration in accordance with example implementations of the present application.

FIG. 5 illustrates an example interface (UI) 500 for setting voltage tap configurations in accordance with example implementations of the present application. The UI 500 may be displayed on display screen of a computing device, such as computing device 1905 of FIG. 19. As illustrated, the UI 500 may provide multiple fields or control options 505-520 to help a user set up the voltage taps to power the data transmitter 225. Field 505 may be used to specify whether the voltage taps are being set up using spare breakers or using wired breakers. Field 510 may provide warnings or tips for the user (e.g., "Ensure the breakers are turned off. Connect voltage tap cables to breakers.") Fields 515 and 520 may provide instructions to the user that may be followed to set up the voltage tap all without having to consult a separate instruction or assembly manual.

Figure 6:
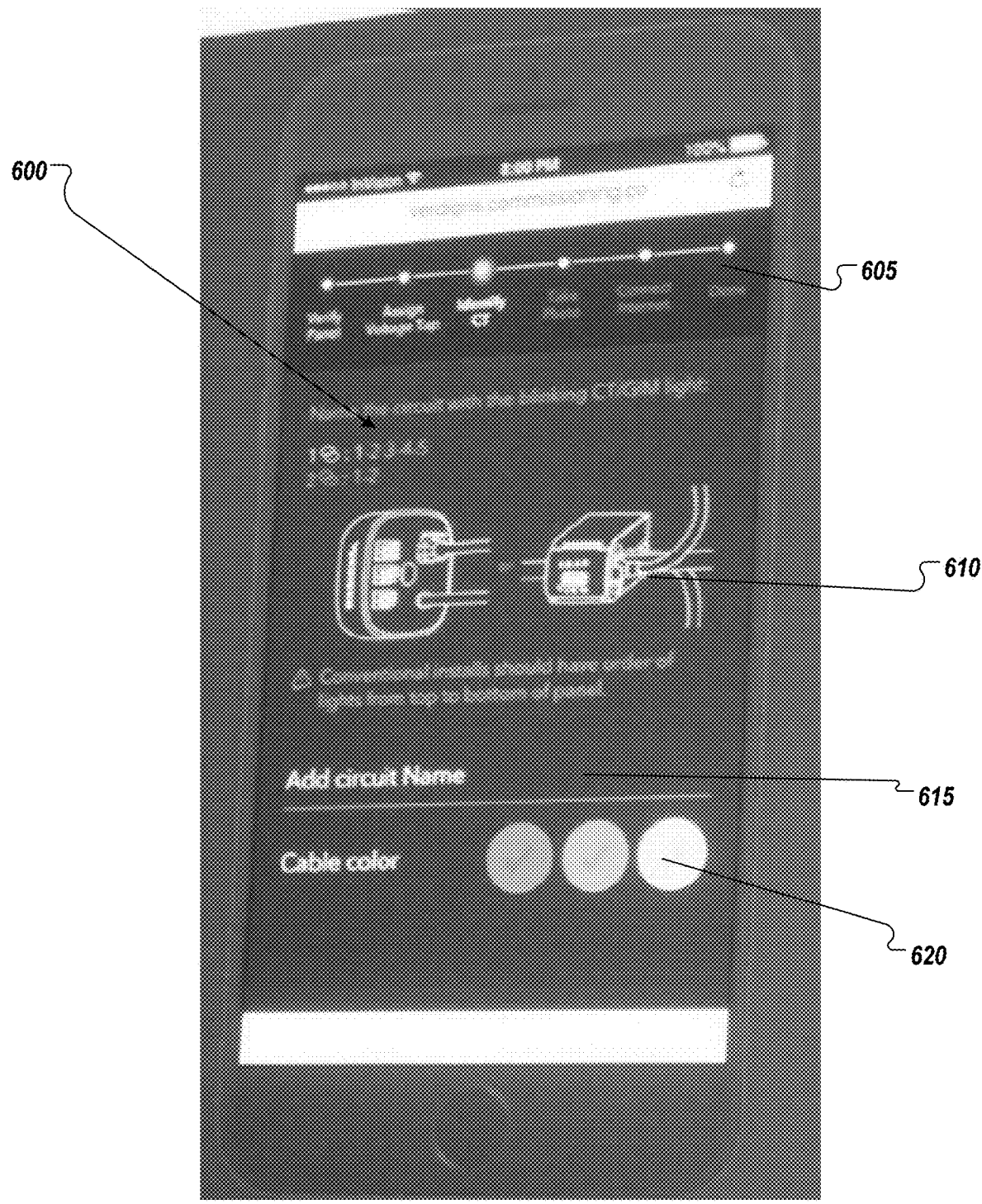
FIG. 6 illustrates an example interface (UI) for current transformer configuration in accordance with example implementations of the present application.

FIG. 6 illustrates an example interface (UI) 600 for current transformer configuration in accordance with example implementations of the present application. The UI 600 may be displayed on a display screen of a computing device, such as computing device 1905 of FIG. 19. As illustrated, the UI 600 may provide multiple fields or control options 605-620 to help the user configure each current transformer or sensor used to monitor the panel set-up using UI 400 discussed above. Field 605 may provide a current status (e.g., a timeline or other indicator of configuration stage) of the configuration or commissioning process. Field 610 may provide instructions and diagrams to show the user how to configure each current transformer. Field 615 may provide an area for the user to name or identify the circuit to be associated with each current transformer. Control 620 may allow the user to specify a cable or wire color associated with each current transformer being set up.

Figure 7:
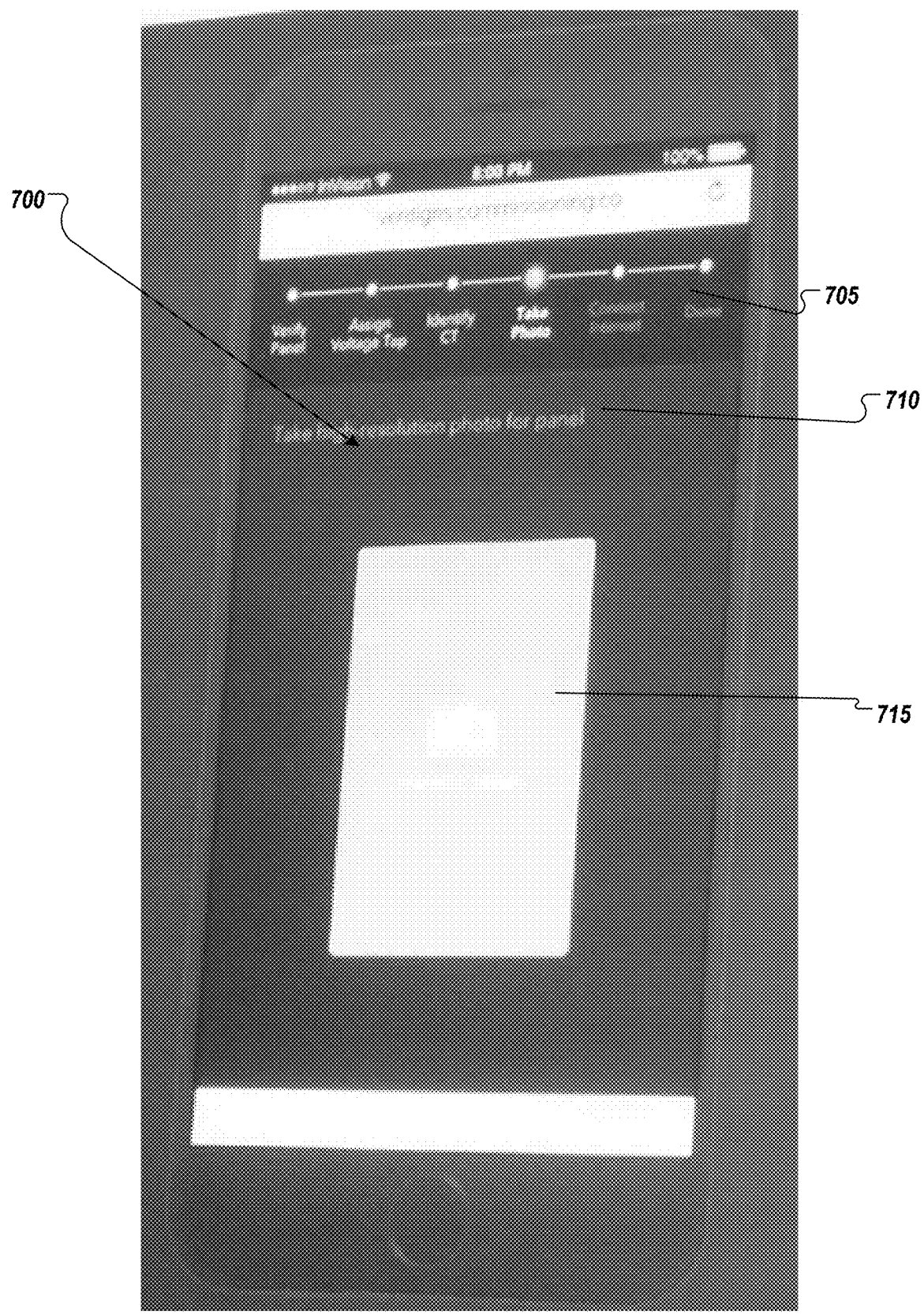
FIG. 7 illustrates an example interface (UI) for photographic recognition in accordance with example implementations of the present application.

FIG. 7 illustrates an example interface (UI) 700 for photographic recognition in accordance with example implementations of the present application. The UI 700 may be displayed on display screen of a computing device, such as computing device 1905 of FIG. 19. As illustrated, the UI 700 may provide multiple fields 705-715 to help the user set up the current transformers using photographic recognition. Field 705 may provide a current status (e.g., a timeline or other indicator of configuration stage) of the configuration or commissioning process. Field 710 may provide instructions to show the user how to use photographic recognition to set up the current transformer (e.g., please take high-resolution photo for panel). Field 715 may identify a region of the UI 700 within which the panel or specific current transformer should be positioned to facilitate the photographic recognition.

The photographic recognition interface 700 can use the camera of a mobile device or uploaded picture to assist with configuring sensors. In an example implementation, the user can capture or upload an image of labels assigned to the installed circuits. For example, electricians commonly include a diagram on the inside door of the distribution box with labels to identify which position circuit services a particular room or device. Thus, an image capturing the diagram can include labels listing circuit 1 is for the air conditioner, circuit 2 services outdoor lights, circuit 3 services closet on the third floor, etc. The user can also capture an image of the actual distribution box with the sensors attached to the circuits.

The commissioning application may analyze the image of the diagram and sensors to suggest labels to assign for each sensor. For example, the application can analyze the diagram image using optical character recognition (OCR) to collect the labels assigned to the circuits. The application can associate the label from the diagram with the sensor attached to the circuit at the corresponding position. For example, the sensor (e.g., current transformer 205) at each position can be identified using the indicator interface 206 of the sensor. For example, the application can signal each sensor to display different or alternating statuses via the indicators prior to capturing the image. The application can analyze the image based on the statuses of each sensor. The application can automatically assign labels for each sensor that are used to categorize devices detected by the sensors during a power signature analysis process.

Figure 8:
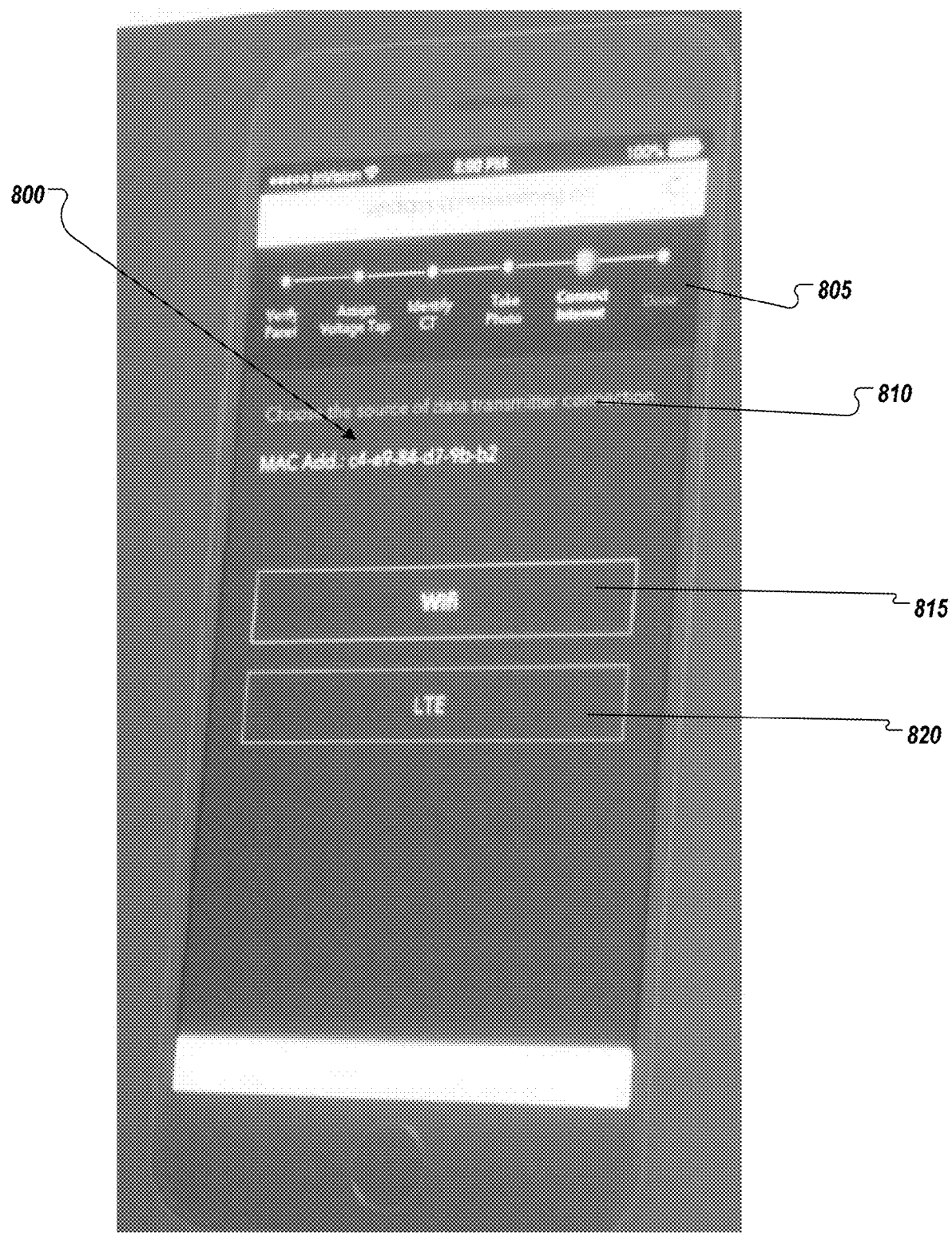
FIG. 8 illustrates an example interface (UI) for connecting a network in accordance with an example implementation.

FIG. 8 illustrates an example interface (UI) 800 for connecting a network in accordance with an example implementation. The UI 800 may be displayed on a display screen of a computing device, such as computing device 1905 of FIG. 19. As illustrated, the UI 800 may provide a variety of fields or controls 805-820 to assist the user in setting up a network. Field 805 may provide a current status of the commissioning or configuration process (e.g., a timeline or stage diagram of the commissioning or configuration process). Field 810 may provide instructions on how to connect to the network (e.g., "Choose the source of data transmitter connection"). In some example implementations, Field 810 may also provide device information (e.g., Mac address, IP address etc.) associated with the device on which the application is running (e.g., computing device such as computing device 1905 of FIG. 19 discussed below). Controls 815 and 820 may be used to specify the type of network or data transmission that should be used. For example, the data transmitter 225 may connect via an LTE signal, Wi-Fi, Ethernet connection, etc.

Figure 9:
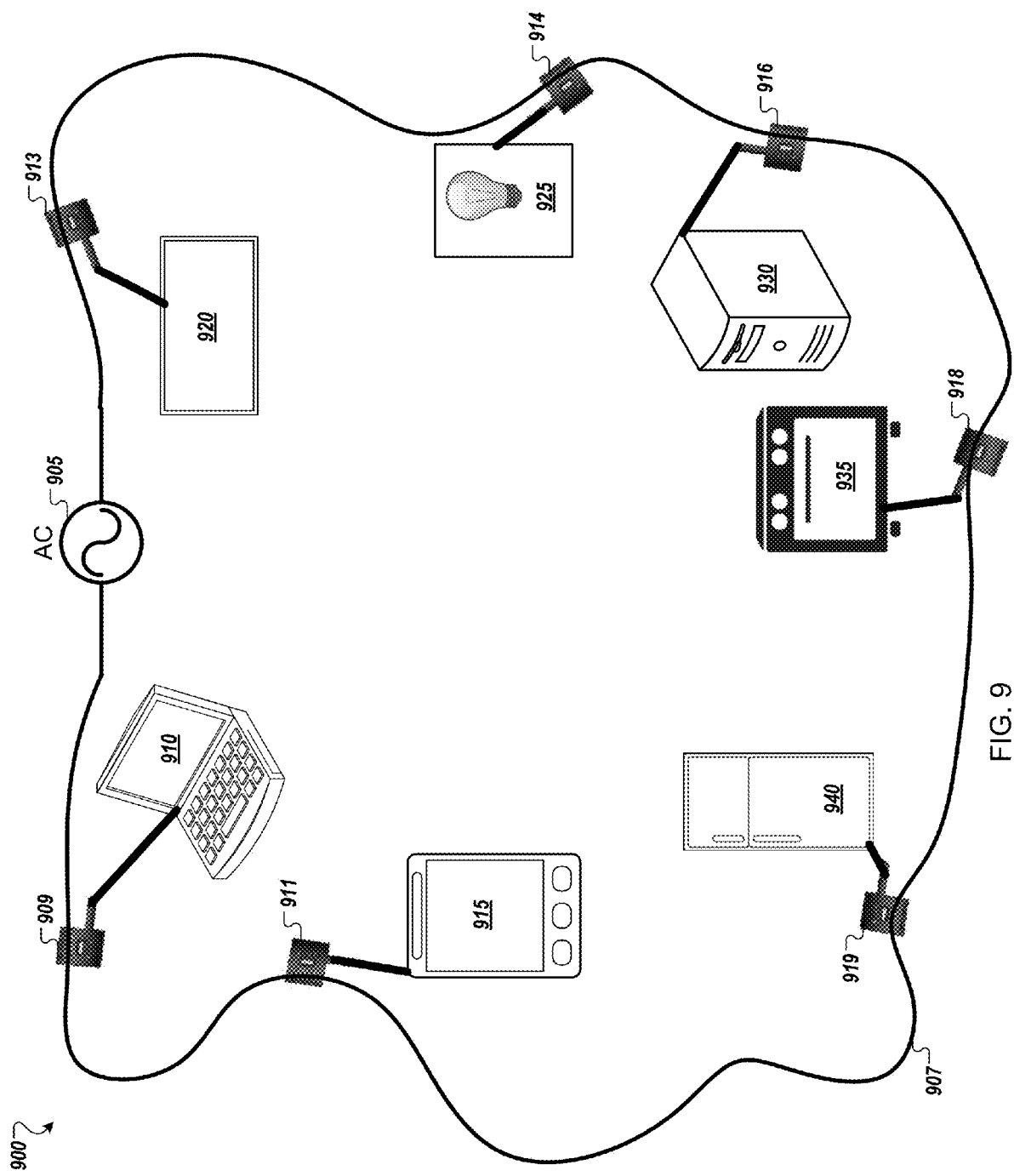
FIG. 9 illustrates a power distribution system using example current transformers in accordance with aspects of the present disclosure.

FIG. 9 illustrates a power distribution system 900 using example current transformers 909, 911, 913, 914, 916, 918, 919 in accordance with aspects of the present disclosure. Power distribution systems such as illustrated in FIG. 9 may be set up and monitored using configuration or commissioning processes such as those described herein.

As illustrated, the power distribution system 900 includes an alternating current (AC) power source 905 (e.g., an AC generator, or other AC source that might be apparent to a person of ordinary skill in the art connected to power distribution line 907 (e.g., a power cable through which the AC current may be transmitted).

In the power distribution system 900, a series of current transformers 909, 911, 913, 914, 916, 918, 919 may be attached to the power distribution line 907 at any point along its length to allow current extracted at any location along the length of the power distribution line 907. Each current transformer 909, 911, 913, 914, 916, 918, 919 may be attached to the power distribution line 907 by inserting the power distribution line 907 into a sensing gap and closing the upper and lower halves.

Each current transformer 909, 911, 913, 914, 916, 918, 919 may extract current from the power distribution line 907 and provide it to a device 910, 915, 920, 925, 930, 935, 940 connected to one of the current transformers 909, 911, 913, 914, 916, 918, 919. For example, current transformer 909 may be connected to a personal computer device 910 such as a laptop or desktop computer to provide energy thereto. Further, current transformer 911 may be connected to a portable electronic device 915 such as a personal music player, cellular phone, personal digital assistant (PDA), tablet or digital camera to provide energy thereto. Additionally, current transformer 913 may be connected to a personal entertainment device 920 such as a television, stereo system, digital versatile disk (DVD) player, Blu-ray player, etc., to provide energy thereto.

Further, the current transformer 914 may be connected to provide energy to a light source 925, such as a light bulb, light emitting diode (LED), compact florescent lamp (CFL), or other light producing device that might be apparent to a person of ordinary skill in the art. Additionally, the current transformer 916 may be connected to provide energy to a server device 930, mainframe or other networked computing device.

Further, current transformers 918, 919 may be connected to provide electricity to home appliances 935, 940 such as stoves, ovens, microwaves, refrigerators, etc. Additional current transformers may also be used to extract current from the power distribution line 907 and provide energy to any device that might be apparent to a person of ordinary skill in the art.

FIGS. 10-18 illustrate a sequence of UIs 1000-1800 usable in a commissioning process, such as commissioning process 300 of FIG. 3 discussed above, in accordance with example implementations of the present application. The UIs 1000-1800 may be displayed on a display screen of a computing device, such as computing device 1905 of FIG. 19.

Figure 10:
FIGS. 10-18 illustrate a sequence of UIs usable in a commissioning process in accordance with example implementations of the present application.

The UI 1000 of FIG. 10 may represent an initiation screen used to initiate the configuration or commissioning process. As illustrated, the UI 1000 may provide multiple fields or controls 1005-1015 to allow a user to initiate the configuration or the commissioning process. Field 1005 may provide information to the user such as serial numbers, MAC addresses, or other information relevant to initiating the configuration or the commissioning process. Control 1010 may allow the user to specify a country or region for which the system configuration process may be used. In some example implementations different processes or different languages of the UI 1000 may be initiated or switched based on control 1010. Control 1015 may allow the user to start the configuration or commissioning process.

Figure 11:
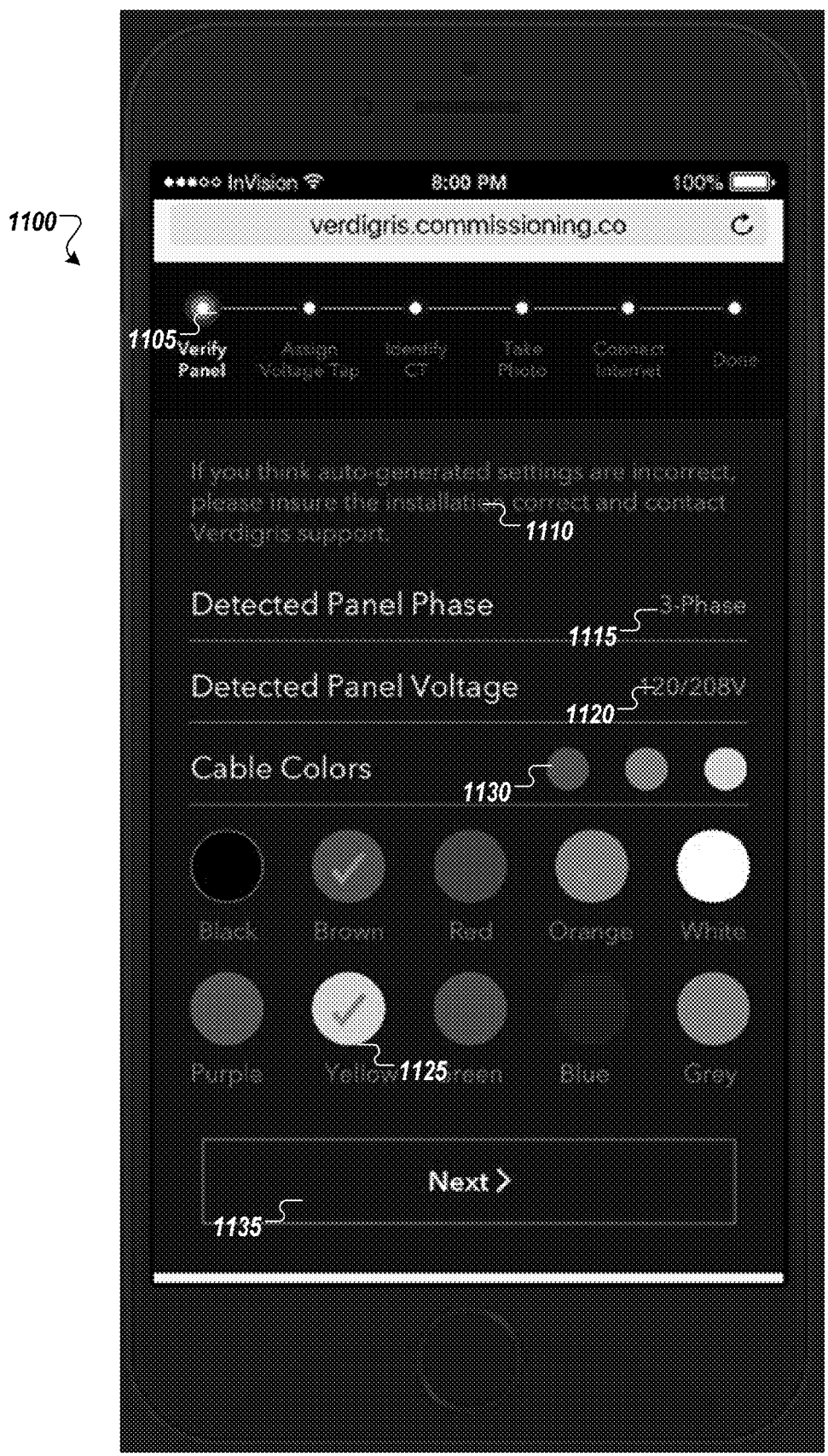

The UI 1100 of FIG. 11 may represent a panel verification or configuration screen used to verify or configure the panel during the configuration or the commissioning process. As illustrated, the UI 1100 may provide multiple fields or controls 1105-1135 that may allow a user to verify or configure the panel during the configuration or the commissioning process. Field 1105 may provide a current status (e.g., a timeline or other indicator of configuration stage) of the configuration or commissioning process. Field 1110 may provide a name or identifier associated with the panel being verified or configured. This name or identifier may be automatically detected using a photo recognition process as described above, or may be manually entered by a user using the UI 1100. Fields 1115 and 1120 may provide panel configuration and panel voltage information, respectively.

Fields 1115, 1120 may be automatically detected using the photo recognition process discussed above or another automated process, such as measuring voltage, current, or phase of the power system, as may be apparent to person of ordinary skill the art or may be manually configured by a user. Control 1125 may be used to specify cable colors associated with the panel and Field 1130 may display the results of the specification provided using control 1125. Control 1135 may be used to move to the next UI in the sequence.

Figure 12:
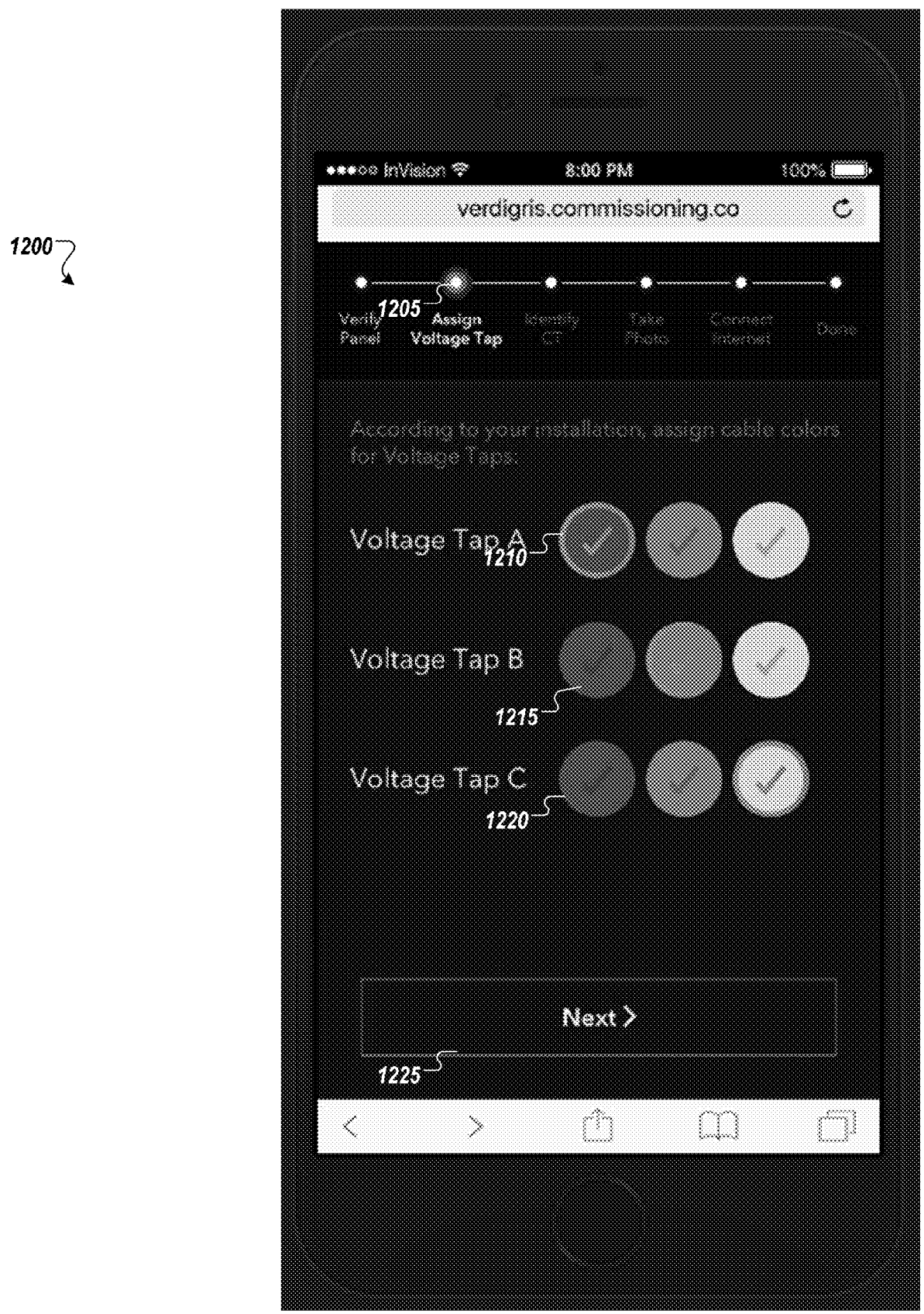

The UI 1200 of FIG. 12 may represent a tap assignment screen used to set up and assign voltage taps during the commissioning or configuring process. As illustrated, the UI 1200 may provide multiple fields or controls 1205-1225 that may allow a user to assign and configure the voltage taps. Field 1205 may provide a current status (e.g., a timeline or other indicator of configuration stage) of the configuration or commissioning process. Controls 1210-1220 may be used to specify voltage tap colors according to a user specific installation. Control 1225 may be used to move to the next UI in the sequence.

Figure 13:
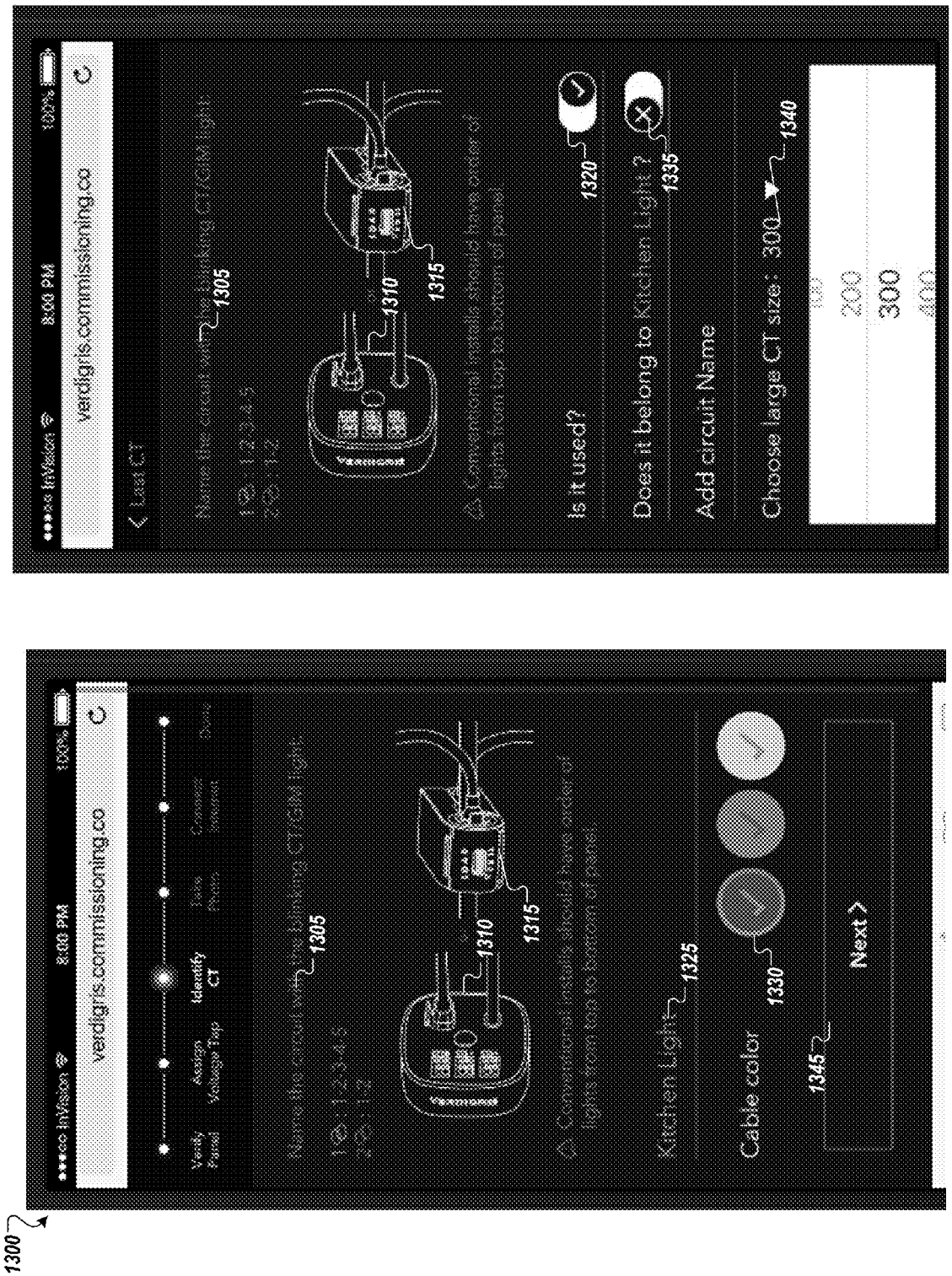

UI 1300 of FIG. 13 may represent a sensor (current transformer) setup or configuration screen for the first of several sensors to be installed. As illustrated, the UI 1300 may provide multiple fields or controls 1305-1345 that may allow a user to set up and configure the first of several sensors being attached to a power system. Field 1305 may provide information or instructions to a user in combination with diagrams 1310, 1315 to allow a user to understand each step of the setup process. For example as illustrated, the user may be instructed to find a blinking light on a specific sensor while the system controls a specific sensor to blink in a specific fashion to allow the user to understand which sensor be should be placing first.

Control 1320 allows a user to specify whether a terminal block is being used in combination with the sensor. In some example implementations a sensor which must be connected to a terminal block such as illustrated in diagram 1310 may be used. In other example implementations a clip sensor such as that illustrated in diagram 1315 may be used.

Control 1325 may be used to assign an identifier or name to the sensor being set up using UI 1300. Control 1330 may be used to specify the cable color associated with the sensor being set up. Control 1335 may be used to specify whether alternating current measuring sensor (e.g., a Rogowski coil) is being used. Field 1340 may indicate the current associated with the sensor being set up using UI 1300. The current may be automatically detected by the sensor or may be manually adjusted by the user. Control 1345 maybe used to move to the next UI in the sequence.

Figure 14:
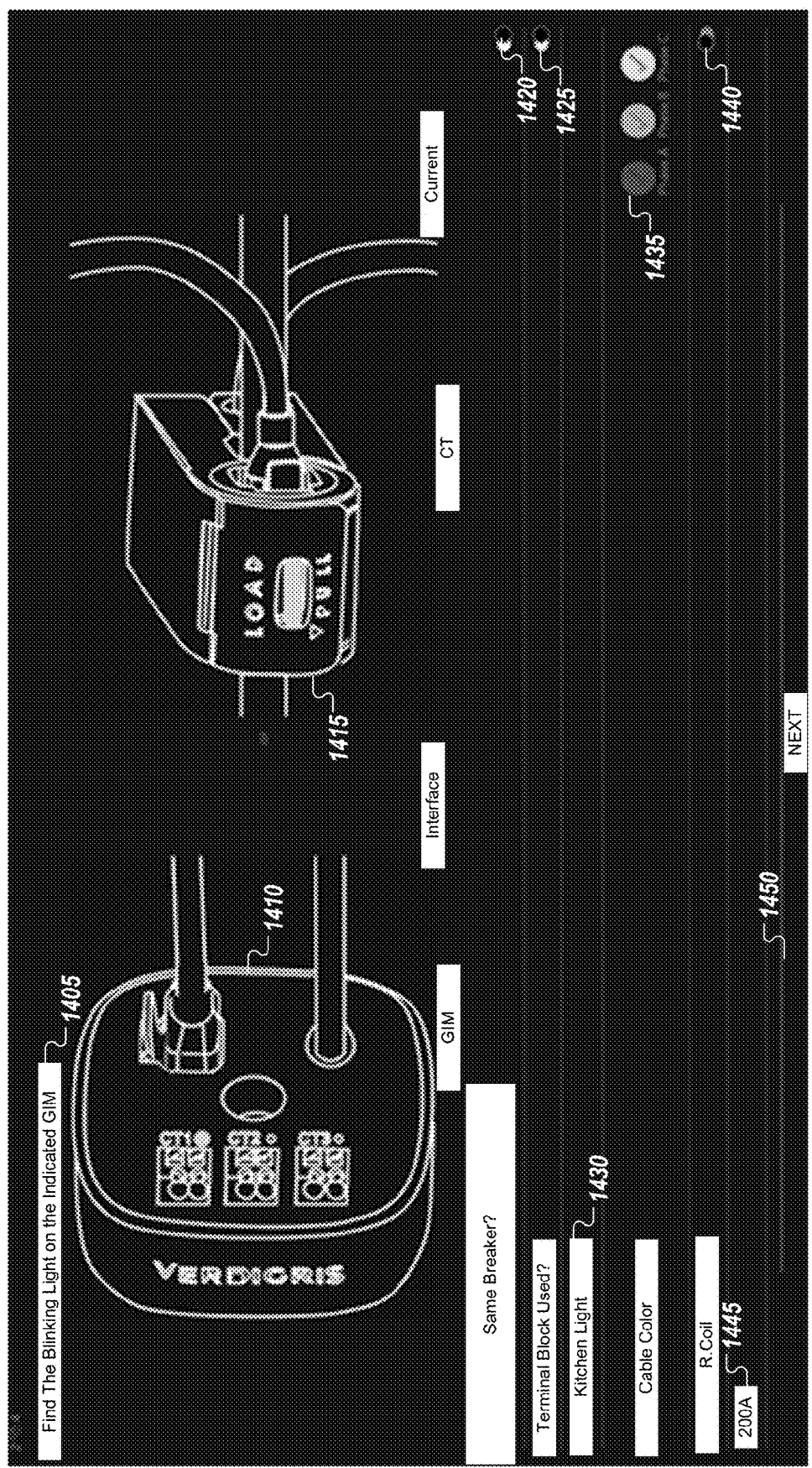

UI 1400 of FIG. 14 may represent a sensor (current transformer) setup or configuration screen for the additional sensors to be installed. As illustrated, the UI 1400 may provide multiple fields or controls 1405-1445 that may allow a user to set up and configure the additional sensors being attached to a power system. Field 1405 may provide information or instructions to a user in combination with diagrams 1410, 1415 to allow a user to understand each step of the setup process. For example as illustrated, the user may be instructed to find a blinking light on a specific sensor while the system controls a specific sensor to blink in a specific fashion to allow the user to understand which sensor he should be placing first.

Control 1420 allows a user to specify whether the sensor is to be associated with the same circuit breaker of a previous sensor. Control 1425 allows a user to specify whether a terminal block is being used in combination with the sensor. In some example implementations, a sensor, which must be connected to a terminal block such as illustrated in diagram 1410, may be used. In other example implementations a clip sensor such as that illustrated in diagram 1415 may be used.

Control 1430 may be used to assign an identifier or name to the sensor being set up using UI 1400. Control 1435 may be used to specify the cable color associated with the sensor being set up. Control 1440 may be used to specify whether alternating current measuring sensor (e.g., a Rogowski coil) is being used. Field 1445 may indicate the current associated with the sensor being set up using UI 1400. The current may be automatically detected by the sensor or may be manually adjusted by the user. Control 1450 maybe used to move to the next UI in the sequence.

Figure 15:
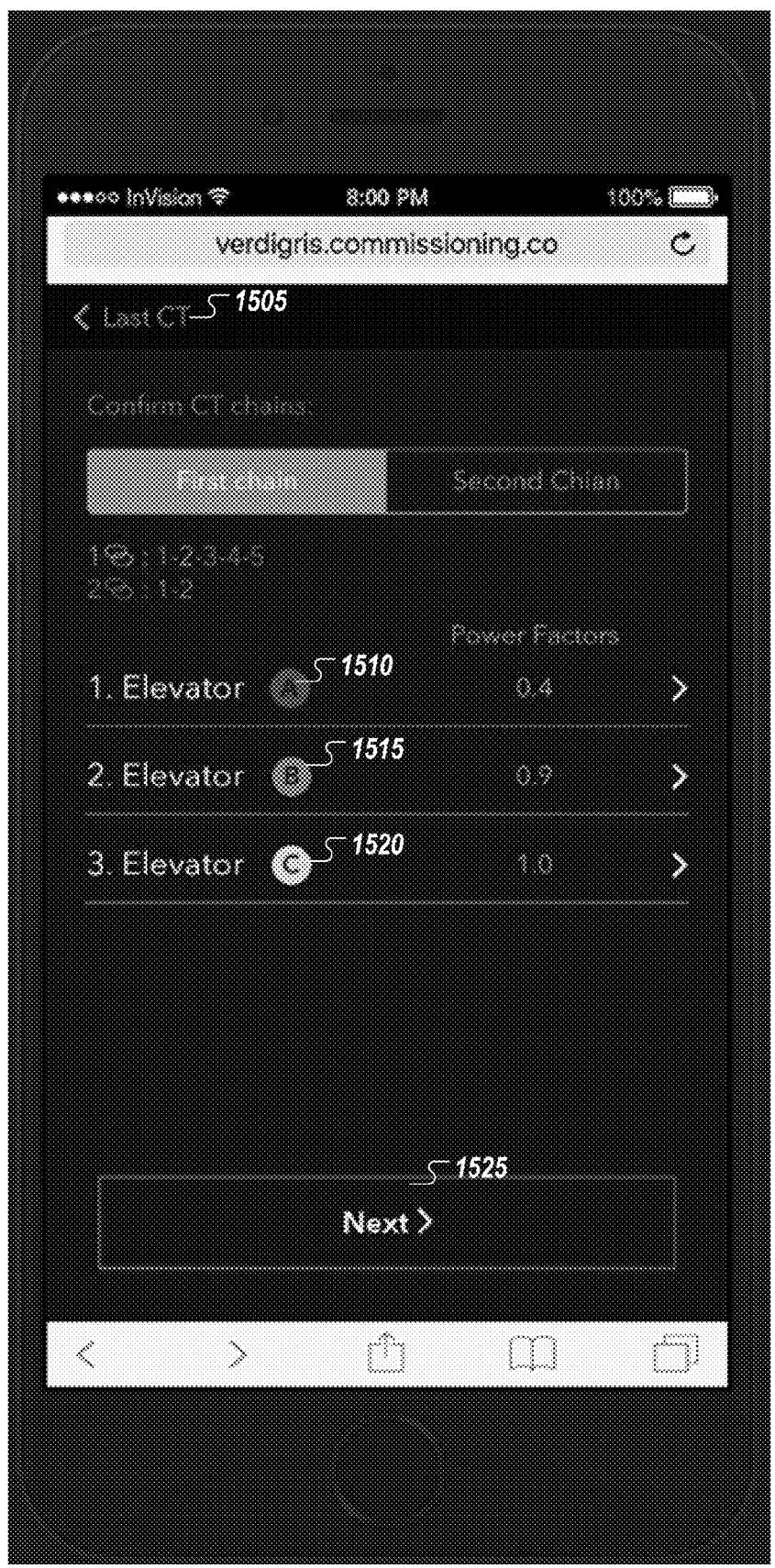

UI 1500 of FIG. 15 may represent a sensor summary screen used to review the assigned wire colors of a plurality of sensors which were set up using UIs 1300, 1400 of FIGS. 13 and 14. The illustrated sensors may form a sensor chain by being connected together as described above (e.g., a sensor daisy-chain). As illustrated, the UI 1500 may include multiple fields or controls 1505-1525. Control 1505 may allow the user to navigate back to a previously set up sensor (e.g., CT or current transformer). Fields 1510-1520 may show the sensor names or identifiers and wire colors assigned using the UIs 1300, 1400. Control 1525 may be used to move to the next UI in the sequence.

Figure 16:
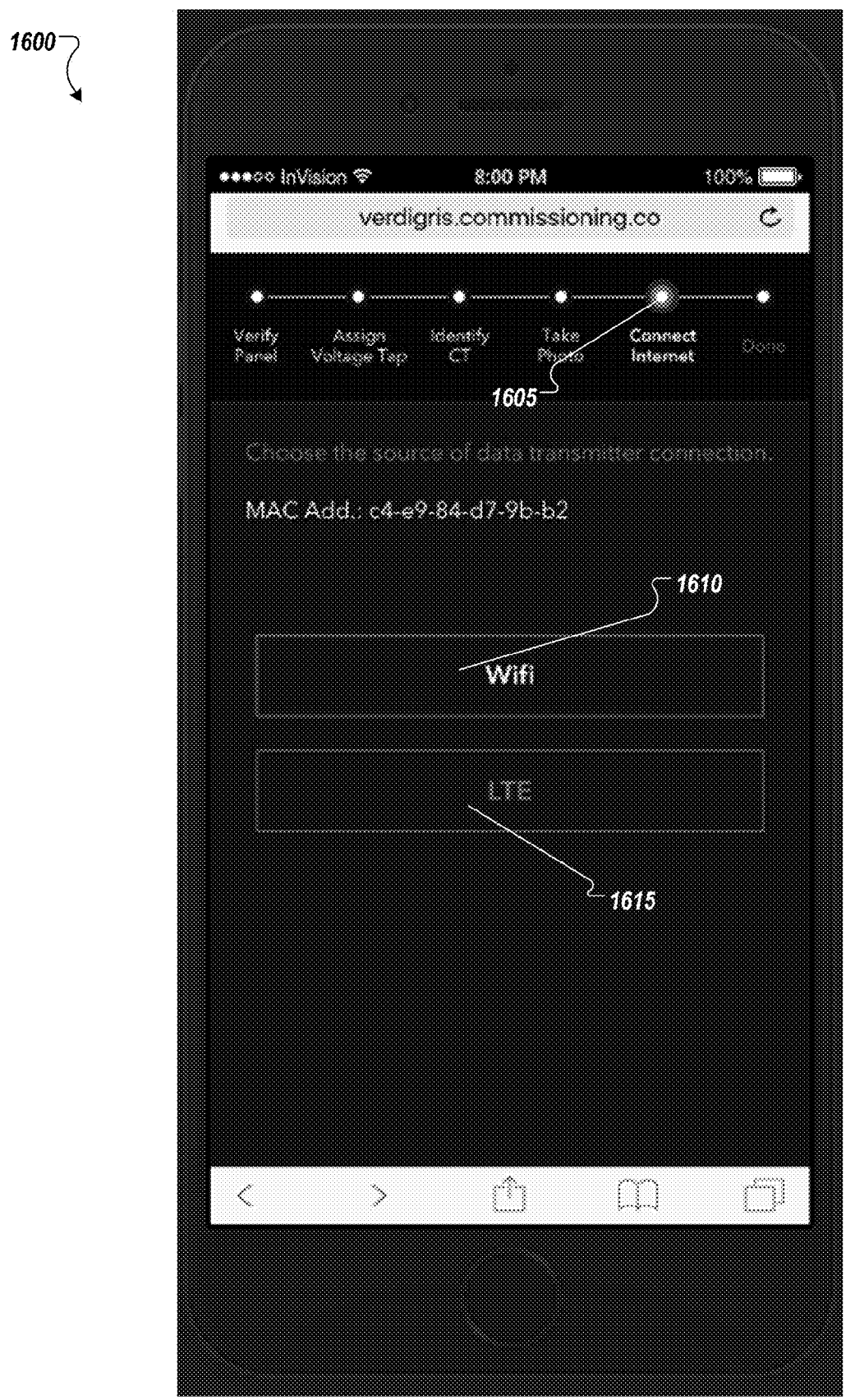

The UI 1600 of FIG. 16 illustrates a network selection screen that may be used to select a type of network. As illustrated, the UI 1600 may provide a variety of fields or controls 1605-1615 to assist the user to select a type of network. Field 1605 may provide a current status of the commissioning or configuration process (e.g., a timeline or stage diagram of the commissioning or configuration process). Controls 1610 and 1615 may be used to specify the type of network or data transmission that should be used. For example, the data transmitter 225 may connect via an LTE signal, Wi-Fi, Ethernet connection, etc.

Figure 17:

The UI 1700 of FIG. 17 illustrates a network configuration screen that may be used to configure the network once selected. As provided, the UI 1700 may provide a variety of fields or controls 1705-1730 that may be used to set up a network. Control 1705 may be used to navigate back to UI 1600 to select a different type of network. Field 1710 may provide network identification information that has been automatically detected. Control 1715 may be used to select a custom network identification that will be entered. Field 1720 may be used to enter a password associated with a network. Control 1725 may be used to access additional network settings. Control 1730 may be used to submit the network settings entered using UI 1700.

Figure 18:
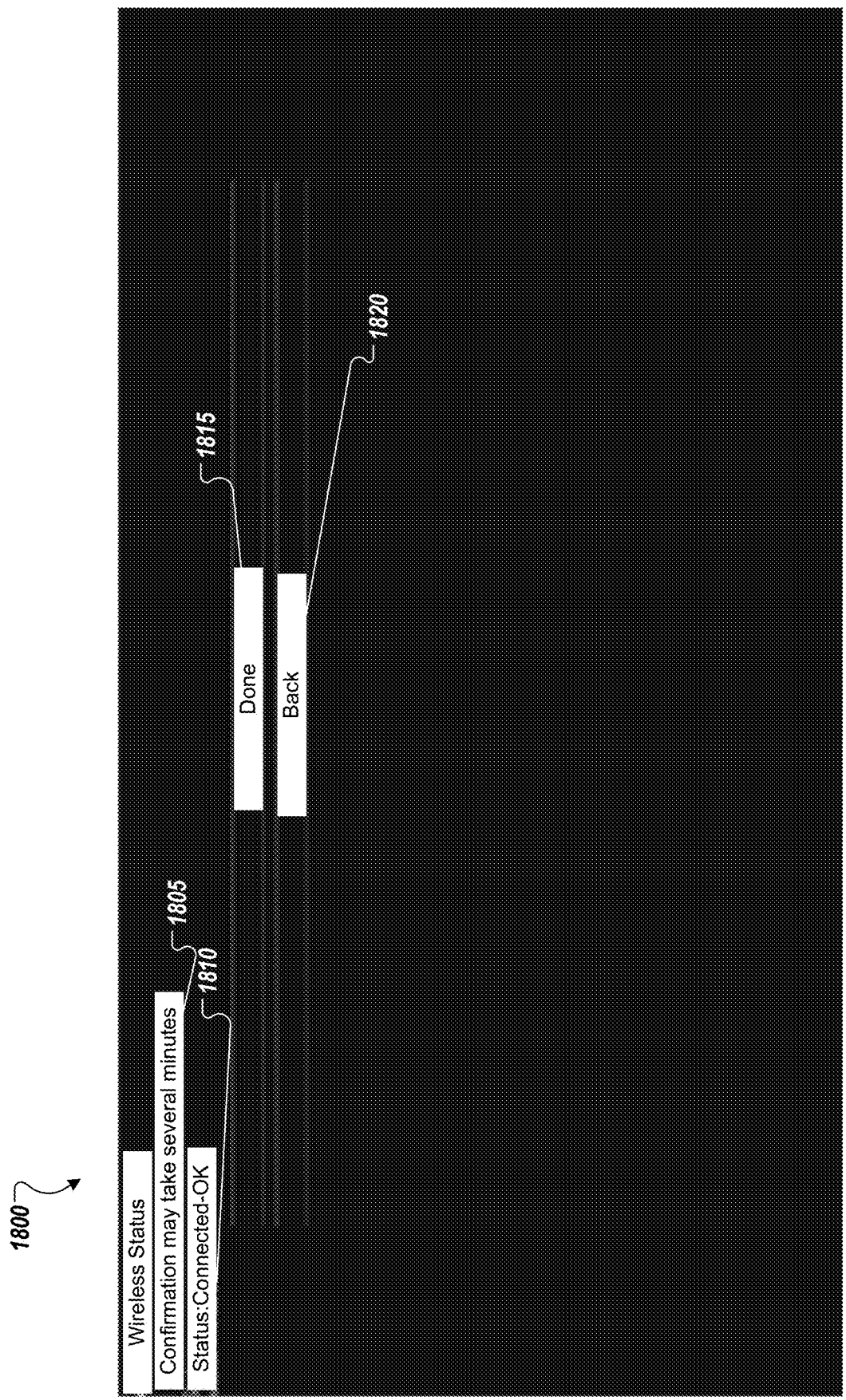

The UI 1800 of FIG. 18 illustrates a network status screen that may be displayed once the network has been configured. As provided, the UI 1800 may provide a variety of fields or controls 1805-1820 that may be used to reconfigure or change network status. Fields 1805 and 1810 may provide information to the user regarding the current network status or the configuration process. Control 1815 may be used to complete the commissioning or configuration process. Control 1820 maybe used to navigate back to UI 1700 of FIG. 17 to modify the network configuration settings.

Figure 19:
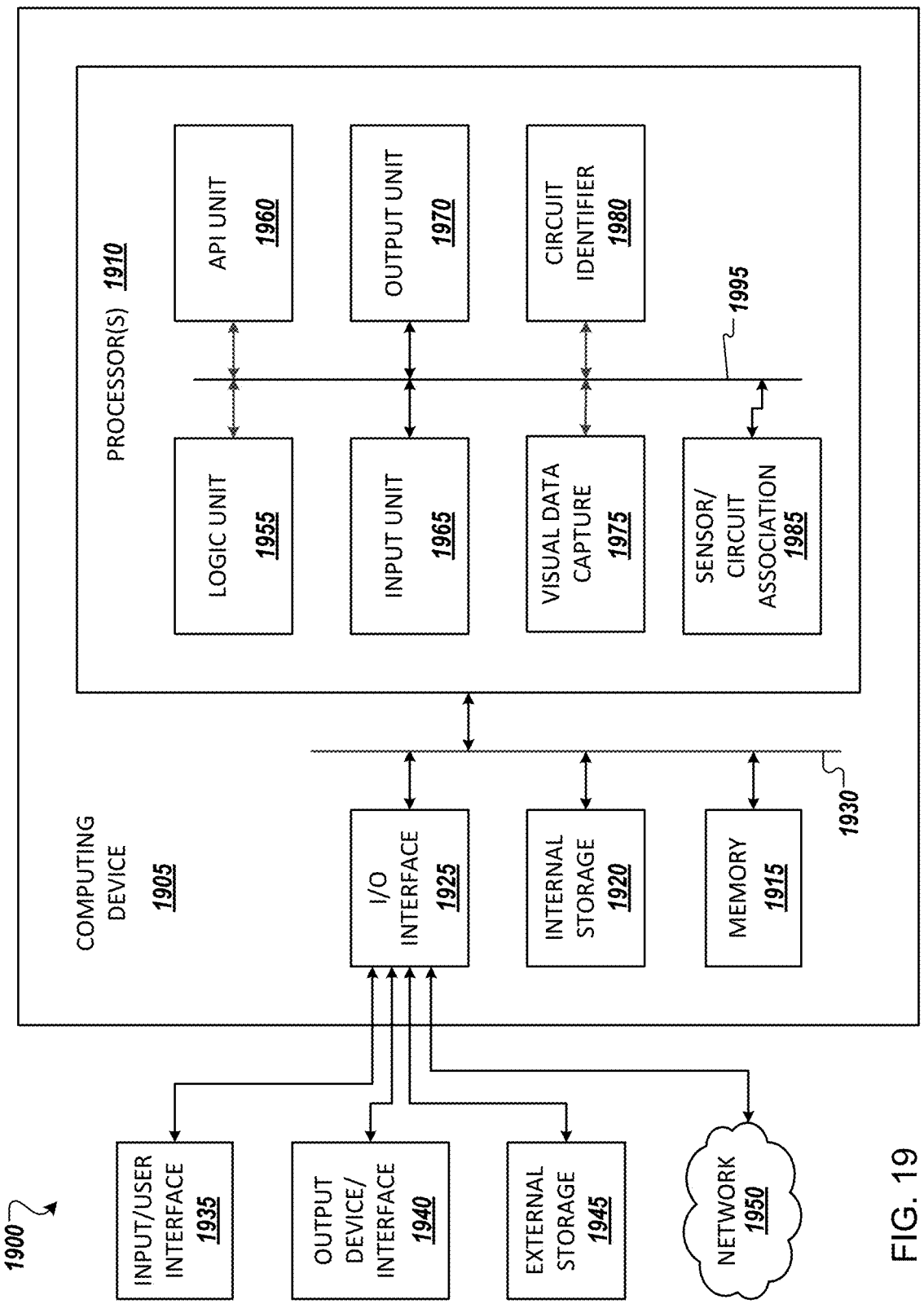
FIG. 19 illustrates an example computing environment with an example computer device suitable for use in some example implementations of the present application.

FIG. 19 illustrates an example computing environment 1900 with an example computer device 1905 suitable for use in some example implementations. Computing device 1905 in computing environment 1900 can include one or more processing units, cores, or processors 1910, memory 1915 (e.g., RAM, ROM, and/or the like), internal storage 1920 (e.g., magnetic, optical, solid state storage, and/or organic), and/or I/O interface 1925, any of which can be coupled on a communication mechanism or bus 1930 for communicating information or be embedded in the computing device 1905.

Computing device 1905 can be communicatively coupled to input/interface 1935 and output device/interface 1940. Either one or both of input/interface 1935 and output device/interface 1940 can be a wired or wireless interface and can be detachable. Input/interface 1935 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 1940 may include a display, television, monitor, printer, speaker, braille, or the like. In some example implementations, input/interface 1935 (e.g., user interface) and output device/interface 1940 can be embedded with, or physically coupled to, the computing device 1905. In other example implementations, other computing devices may function as, or provide the functions of, an input/interface 1935 and output device/interface 1940 for a computing device 1905. These elements may include, but are not limited to, well-known AR hardware inputs so as to permit a user to interact with an AR environment.

Examples of computing device 1905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 1905 can be communicatively coupled (e.g., via I/O interface 1925) to external storage 1945 and network 1950 for communicating with any number of networked components, devices, and systems, including one or more computing devices of the same or different configuration. Computing device 1905 or any connected computing device can be functioning as, providing services of, or referred to as a server, client, thin server, general machine, special-purpose machine, or another label.

I/O interface 1925 can include, but is not limited to, wired and/or wireless interfaces using any communication or I/O protocols or standards (e.g., Ethernet, 1902.11xs, Universal System Bus, WiMAX, modem, a cellular network protocol, and the like) for communicating information to and/or from at least all the connected components, devices, and networks in computing environment 1900. Network 1950 can be any network or combination of networks (e.g., the Internet, local area network, wide area network, a telephonic network, a cellular network, satellite network, and the like).

Computing device 1905 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1910 can execute under any operating system (OS) (not shown), in a native or virtual environment. One or more applications can be deployed that include logic unit 1955, application programming interface (API) unit 1960, input unit 1965, output unit 1970, visual data capture unit 1975, circuit identifier unit 1980, and sensor/circuit association unit 1985, and inter-unit communication mechanism 1995 for the different units to communicate with each other, with the OS, and with other applications (not shown).

For example, the visual data capture unit 1975, circuit identifier unit 1980, and sensor/circuit association unit 1985 may implement one or more processes shown in FIG. 3. The described units and elements can be varied in design, function, configuration, or implementation and are not limited to the descriptions provided.

In some example implementations, when information or an execution instruction is received by API unit 1960, it may be communicated to one or more other units (e.g., visual data capture unit 1975, circuit identifier unit 1980, and sensor/circuit association unit 1985). For example, visual data capture unit 1975 may control a camera or image capture device using the input interface 1935 to capture image data from one or more sensors and at least one circuit panel. Further, the circuit identifier unit 1980 may identify a circuit based on the captured visual data. Further, the sensor/circuit association unit 1985 may associate or assign the at least one sensor to a circuit based on the captured visual data. Based on the association, a UI with electronic data of the circuit measured by the sensor may be displayed.

In some instances, the logic unit 1955 may be configured to control the information flow among the units and direct the services provided by API unit 1960, input unit 1965, visual data capture unit 1975, circuit identifier unit 1980, and sensor/circuit association unit 1985 in some example implementations described above. For example, the flow of one or more processes or implementations may be controlled by logic unit 1955 alone or in conjunction with API unit 1960.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying implementations and their equivalents are intended to cover such forms or modifications as would fall within the scope and spirit of the protection.

Some portions of the detailed description are presented in terms of algorithms and symbolic representations of operations within a computer. These algorithmic descriptions and symbolic representations are the means used by those skilled in the data processing art to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to, optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It can be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application may be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

We claim:

1. A method of facilitating configuration of at least one sensor with data transmitter communicatively coupled to an analysis engine for a building management system, wherein an application is configured to be run on a mobile device and interact with the at least one sensor, the method comprising: communicating, by the application, with the at least one sensor to display a visual indicator; capturing, data representative of the visual indicator; and associating the at least one sensor with a circuit of a building power system based on the captured data, where the method further comprises capturing data representative of a distribution panel of the building power system, and identifying, based on the data representative of the distribution panel, the circuit to be associated with the at least one sensor, providing guidance, by the application, to set up a voltage tap on a breaker to power the at least one sensor and data transmitter based on the association of the at least one sensor and the circuit; and wherein the capturing data representative of the distribution panel comprises one or more of capturing spatial information associated with placement of circuits within the distribution panel and detecting color information associated with wires of the circuits within the distribution panel.

2. The method of claim 1, wherein the visual indicator displayed by the at least one sensor comprises an illuminated LED disposed on the at least one sensor.

3. The method of claim 2, wherein the application communicates to the at least one sensor a pattern to be displayed by the illuminated LED to facilitate associating the at least one sensor with the circuit of the building power system.

4. The method of claim 1, wherein voltage tap cables are connected to a terminal block of the data transmitter.

5. The method of claim 4, further comprising, controlling, by the application, the data transmitter to generate an indicative visual signal to indicate the voltage tap was successful.

6. The method of claim 1, wherein the capturing is performed by a sensing device.

7. The method of claim 6, wherein the sensing device is associated with a mobile device.

8. The method of claim 6, wherein the sensing device is a camera.

9. A non-transitory computer readable medium having stored therein a program for making a computer execute a method of facilitating configuration of at least one sensor with data transmitter communicatively coupled to an analysis engine for a building management system, wherein an application is configured to be run on a mobile device and interact with the at least one sensor, the method comprising: communicating, by the application, with the at least one sensor to display a visual indicator; capturing, data representative of the visual indicator; and associating the at least one sensor with a circuit of a building power system based on the captured data, where the method further comprises capturing data representative of a distribution panel of the building power system, and identifying, based on the data representative of the distribution panel, the circuit to be associated with the at least one sensor, providing guidance, by the application, to set up a voltage tap on a breaker to power the at least one sensor and data transmitter based on the association of the at least one sensor and the circuit; and wherein the capturing data representative of the distribution panel comprises one or more of capturing spatial information associated with placement of circuits within the distribution panel and detecting color information associated with wires of the circuits within the distribution panel.

10. The non-transitory computer readable medium of claim 9, wherein the visual indicator displayed by the at least one sensor comprises an illuminated LED disposed on the at least one sensor.

11. The non-transitory computer readable medium of claim 10, wherein the application communicates to the at least one sensor a pattern to be displayed by the illuminated LED to facilitate associating the at least one sensor with the circuit of the building power system.

12. The non-transitory computer readable medium of claim 9, wherein voltage tap cables are connected to a terminal block of the data transmitter.

13. The non-transitory computer readable medium of claim 12, further comprising, controlling, by the application, the data transmitter to generate an indicative visual signal to indicate the voltage tap was successful.

14. The non-transitory computer readable medium of claim 9, wherein the capturing is performed by a sensing device associated with a mobile device.

15. The non-transitory computer readable medium of claim 14, wherein the sensing device is a camera.

16. A system comprising: at least one sensor; a transmitter communicatively coupled to the at least one sensor; a processor controlled by an application, the application interacting with the at least one sensor, the processor: communicates with the at least one sensor to display a visual indicator; captures, data representative of the visual indicator; and associates the at least one sensor with a circuit of a building power system based on the captured data, wherein the processor captures data representative of a distribution panel of the building power system, and identifies, based on the data representative of the distribution panel, the circuit to be associated with the at least one sensor, provides guidance to set up a voltage tap on a breaker to power the at least one sensor and data transmitter based on the association of the at least one sensor and the circuit; and the capturing data representative of the distribution panel comprises one or more of capturing spatial information associated with placement of circuits within the distribution panel and detecting color information associated with wires of the circuits within the distribution panel.

17. The system of claim 16, wherein the visual indicator displayed by the at least one sensor comprises an illuminated LED disposed on the at least one sensor; and the processor communicates to the at least one sensor a pattern to be displayed by the illuminated LED to facilitate associating the at least one sensor with the circuit of the building power system.

18. The system of claim 16, wherein the processor captures by a sensing device associated with a mobile device.

* * * * *